US012662936B1

(12) United States Patent
Cuevas Maldonado et al.

(10) Patent No.: US 12,662,936 B1
(45) Date of Patent: Jun. 23, 2026

(54) GEOSTEERING CONTROL FRAMEWORK

(71) Applicant: Schlumberger Technology Corporation, Sugar Land, TX (US)

(72) Inventors: Nestor Herman Cuevas Maldonado, Sugar Land, TX (US); Geir Dahl, Stavanger (NO); Kent Harms, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/216,409

(22) Filed: May 22, 2025

(51) Int. Cl.
| | |
|---|---|
| *E21B 49/00* | (2006.01) |
| *E21B 7/04* | (2006.01) |
| *E21B 44/00* | (2006.01) |
| *G01V 11/00* | (2006.01) |

(52) U.S. Cl.
CPC ............... *E21B 49/00* (2013.01); *E21B 7/04* (2013.01); *E21B 44/00* (2013.01); *G01V 11/00* (2013.01); *G01V 2210/6163* (2013.01)

(58) Field of Classification Search
CPC ............ E21B 7/04; E21B 44/00; E21B 49/00
See application file for complete search history.

(56) References Cited

U.S. PATENT DOCUMENTS

| | | | |
|---|---|---|---|
| 2014/0297187 A1 | 10/2014 | Miotti | |
| 2015/0362623 A1 | 12/2015 | Miotti | |
| 2019/0024501 A1 | 1/2019 | Borgos | |
| 2021/0041596 A1* | 2/2021 | Kushwaha | ........... G06N 3/0455 |
| 2024/0151866 A1* | 5/2024 | Cuevas | ................. G01V 1/301 |

FOREIGN PATENT DOCUMENTS

WO      2017142719 A1    8/2017

OTHER PUBLICATIONS

Bachrach, Ran, "Elastic and resistivity anisotropy of shale during compaction and diagenesis: Joint effective medium modeling and field observations", Geophysics, Nov.-Dec. 2011, pp. E175-E186, vol. 76, No. 6.

Bachrach, Ran, "Joint estimation of porosity and saturation using stochastic rock physics modeling", Geophysics, 2006, pp. 053-063, vol. 71, No. 5.

Barclay, F. et al., "Seismic inversion: Reading between the lines", Oilfield Review, 2008, pp. 42-63.

Carcione, J. M. et al., "Cross-property relations between electrical conductivity and the seismic velocity of rocks", Geophysics, Sep.-Oct. 2007, pp. E193-E204, vol. 72, No. 5.

(Continued)

*Primary Examiner* — Tara Schimpf
*Assistant Examiner* — Lamia Quaim
(74) *Attorney, Agent, or Firm* — Kyle R. Miiller

(57) ABSTRACT

A method may include receiving resistivity data acquired by a downhole tool of a drillstring disposed at least in part in a borehole in a subsurface environment, where the borehole includes a downhole end, and where the borehole defines a borehole axis; receiving seismic data for the subsurface environment, where the seismic data include spatial locations; inverting at least a portion of the resistivity data and at least a portion of the seismic data to estimate values for a number of physical properties of a portion of the subsurface environment; and generating reservoir quality metric values using the values for the number of physical properties.

18 Claims, 11 Drawing Sheets

(56) References Cited

OTHER PUBLICATIONS

Clavaud, Jean-Baptiste, "Intrinsic Electrical Anisotropy of Shale: The Effect of Compaction", Petrophysics, Jun. 2008, pp. 243-260, vol. 49, No. 3.

Dell Aversana, P. et al., "Joint inversion of rock properties from sonic, resistivity and density well-log measurements", Geophysical Prospecting, EAGE, 2011, pp. 1144-1154, vol. 59.

Giraud, J. et al., "Simultaneous joint inversion of electromagnetic and seismic full-waveform data: A sensitivity analysis to Biot parameter", 75th EAGE Conference & Exhibition, 2013, 5 pages.

Krief, M. et al., "A petrophysical interpretation using the velocities of P and S waves (Full-waveform sonic)", The Log Analyst, 1990, pp. 355-369.

Miotti, F. et al., "Estimation of rock properties from seismic, EM and gravity well-log measurements", EGM 2010 International Workshop, 2010, 5 pages.

Miotti, F. et al., "Petrophysical Joint Inversion of seismic and EM attributes: a case study", SEG Houston 2013 Annual Meeting, 2013, pp. 2516-2521.

Salim, D. C. et al., "Geosteering Driven by Geophysics—Reservoir Structure Prediction Ahead of Bit", Second Eage/SPE Geosteering and Well Placement Workshop, Nov. 5-8, 2018, 4 pages.

Seydoux, J. et al., "Full 3D deep directional resistivity measurements optimize well placement and provide reservoir-scale imaging while drilling", Proceedings of the SPWLA 55th Annual Logging Symposium, May 18-22, 2014. 14 pages.

Tarchiani, C. et al., "Novel While-drilling Workflow for Reservoir Structural Prediction ahead of the Bit", Proceedings of the 79th EAGE Conference & Exhibition 2017, Jun. 12-15, 2017, 5 pages.

Zhang, Lingyu et al., "Method and Utility of Well Productivity Estimation during Drilling", presented at the International Oil and Gas Conference and Exhibition, SPE-130811-MS, Jun. 2010, 7 pages.

* cited by examiner

System 100

Figure 4:
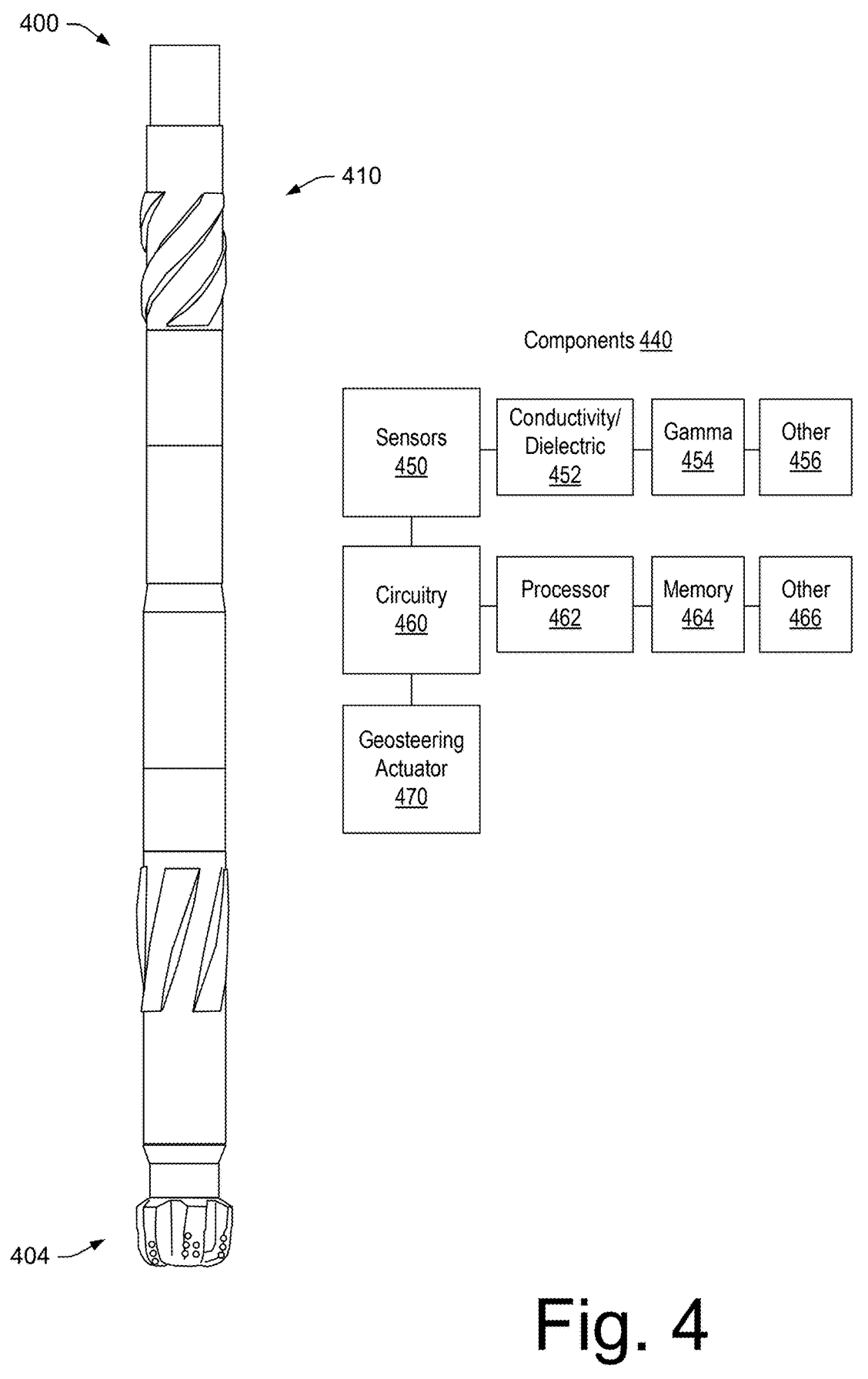

400

410

404

Components 440

| Sensors 450 | Conductivity/ Dielectric 452 | Gamma 454 | Other 456 |

| Circuitry 460 | Processor 462 | Memory 464 | Other 466 |

Geosteering Actuator 470

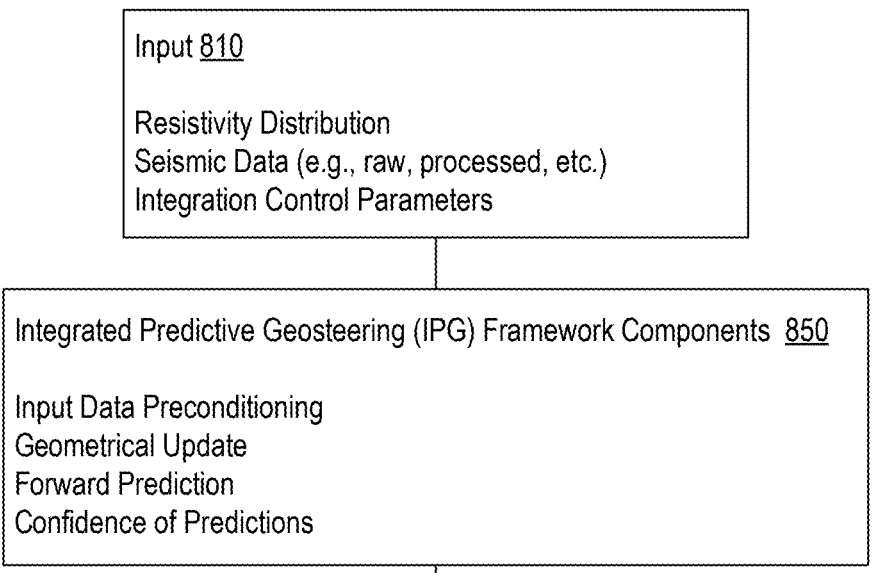

Input 810

Resistivity Distribution
Seismic Data (e.g., raw, processed, etc.)
Integration Control Parameters Integrated Predictive Geosteering (IPG) Framework Components  850

Input Data Preconditioning
Geometrical Update
Forward Prediction
Confidence of Predictions Output  880

Updated Position of Seismic Data, etc.
Extrapolated Property Distribution to Positions Ahead of Drill Bit
Geometrical Objects Quantifying/Displaying Uncertainty of Prediction
Spatial Distribution of Reservoir Property Quantifying and/or displaying Uncertainty of Prediction
Other

801

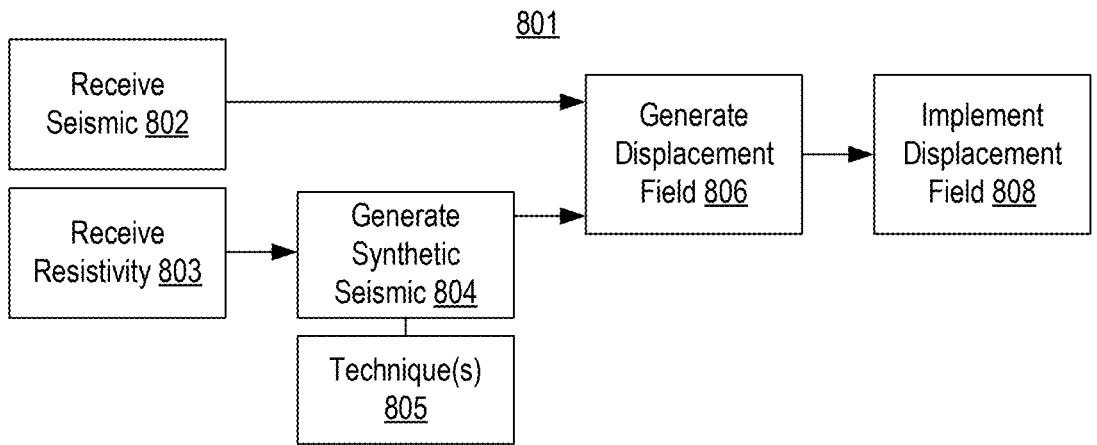

Receive
Seismic 802

Receive
Resistivity 803

Generate
Synthetic
Seismic 804

Technique(s)
805

Generate
Displacement
Field 806

Implement
Displacement
Field 808

Fig. 8

Method <u>1000</u>

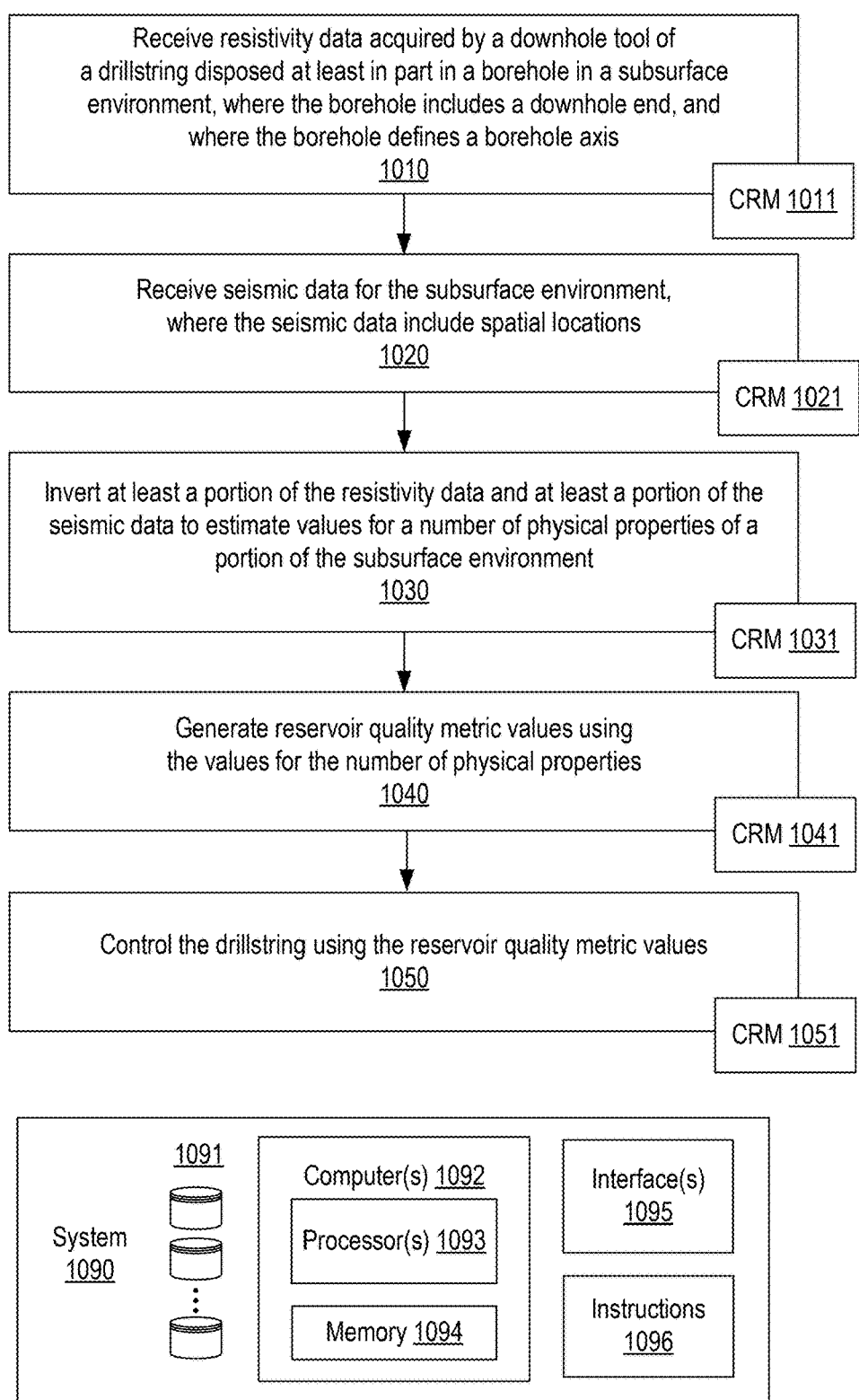

Receive resistivity data acquired by a downhole tool of a drillstring disposed at least in part in a borehole in a subsurface environment, where the borehole includes a downhole end, and where the borehole defines a borehole axis
<u>1010</u>

CRM <u>1011</u>

Receive seismic data for the subsurface environment, where the seismic data include spatial locations
<u>1020</u>

CRM <u>1021</u>

Invert at least a portion of the resistivity data and at least a portion of the seismic data to estimate values for a number of physical properties of a portion of the subsurface environment
<u>1030</u>

CRM <u>1031</u>

Generate reservoir quality metric values using the values for the number of physical properties
<u>1040</u>

CRM <u>1041</u>

Control the drillstring using the reservoir quality metric values
<u>1050</u>

CRM <u>1051</u>

System <u>1090</u>

<u>1091</u>

Computer(s) <u>1092</u>

Processor(s) <u>1093</u>

Memory <u>1094</u>

Interface(s) <u>1095</u>

Instructions <u>1096</u>

GEOSTEERING CONTROL FRAMEWORK

BACKGROUND

Geosteering may provide for directional control of a drill bit of a drillstring using downhole geological logging measurements, for example, to keep a directional wellbore within a pay zone. In various scenarios, geosteering may be used to keep a wellbore in a particular section of a reservoir to minimize gas or water breakthrough and to maximize hydrocarbon production.

SUMMARY

A method may include receiving resistivity data acquired by a downhole tool of a drillstring disposed at least in part in a borehole in a subsurface environment, where the borehole includes a downhole end, and where the borehole defines a borehole axis; receiving seismic data for the subsurface environment, where the seismic data include spatial locations; inverting at least a portion of the resistivity data and at least a portion of the seismic data to estimate values for a number of physical properties of a portion of the subsurface environment; and generating reservoir quality metric values using the values for the number of physical properties. A system can include a processor; memory accessible to the processor; and processor-executable instructions stored in the memory and executable by the processor to instruct the system to: receive resistivity data acquired by a downhole tool of a drillstring disposed at least in part in a borehole in a subsurface environment, where the borehole includes a downhole end, and where the borehole defines a borehole axis; receive seismic data for the subsurface environment, where the seismic data include spatial locations; invert at least a portion of the resistivity data and at least a portion of the seismic data to estimate values for a number of physical properties of a portion of the subsurface environment; generate reservoir quality metric values using the values for the number of physical properties; and control the drillstring using the reservoir quality metric values. One or more non-transitory computer-readable storage media can include processor-executable instructions executable to instruct a processor to: receive resistivity data acquired by a downhole tool of a drillstring disposed at least in part in a borehole in a subsurface environment, where the borehole includes a downhole end, and where the borehole defines a borehole axis; receive seismic data for the subsurface environment, where the seismic data include spatial locations; invert at least a portion of the resistivity data and at least a portion of the seismic data to estimate values for a number of physical properties of a portion of the subsurface environment; generate reservoir quality metric values using the values for the number of physical properties; and control the drillstring using the reservoir quality metric values. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations may be more readily understood by reference to the following description taken in conjunction with the accompanying drawings.

FIG. 4 illustrates an example of a portion of a drillstring that may include various components;

FIG. 8 illustrates an example of a system and an example of a method;

FIG. 10 illustrates an example of a method and an example of a system; and

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, geosteering may provide for directional control of a drill bit of a drillstring using downhole geological logging measurements, for example, to keep a directional wellbore within a pay zone where, in various scenarios, geosteering may be used to keep a wellbore in a particular section of a reservoir to minimize gas or water breakthrough and maximize hydrocarbon production.

A borehole may be referred to as a wellbore and may include an openhole portion or an uncased portion and/or may include a cased portion. A borehole may be defined by a bore wall that is composed of rock that bounds the borehole. As to a well or a borehole, whether for one or more of exploration, sensing, production, injection or other operation(s), it may be planned. Such a process may be referred to generally as well planning, a process by which a path may be mapped in a geologic environment. Such a path may be referred to as a trajectory, which may include coordinates in a three-dimensional coordinate system where a measure along the trajectory may be a measured depth (MD), a total vertical depth (TVD) or another type of measure.

As an example, drilling may include using one or more logging tools that may perform one or more logging operations while drilling or otherwise with a drillstring (e.g., while stationary, while tripping in, tripping out, etc.). As an example, drilling or one or more other operations may occur responsive to measurements. For example, a logging while drilling operation may acquire measurements and adjust drilling based at least in part on such measurements. In such an example, adjustments may be made by actuating one or more geosteering actuators that may provide for orienting a drill bit of a drillstring.

Figure 1:
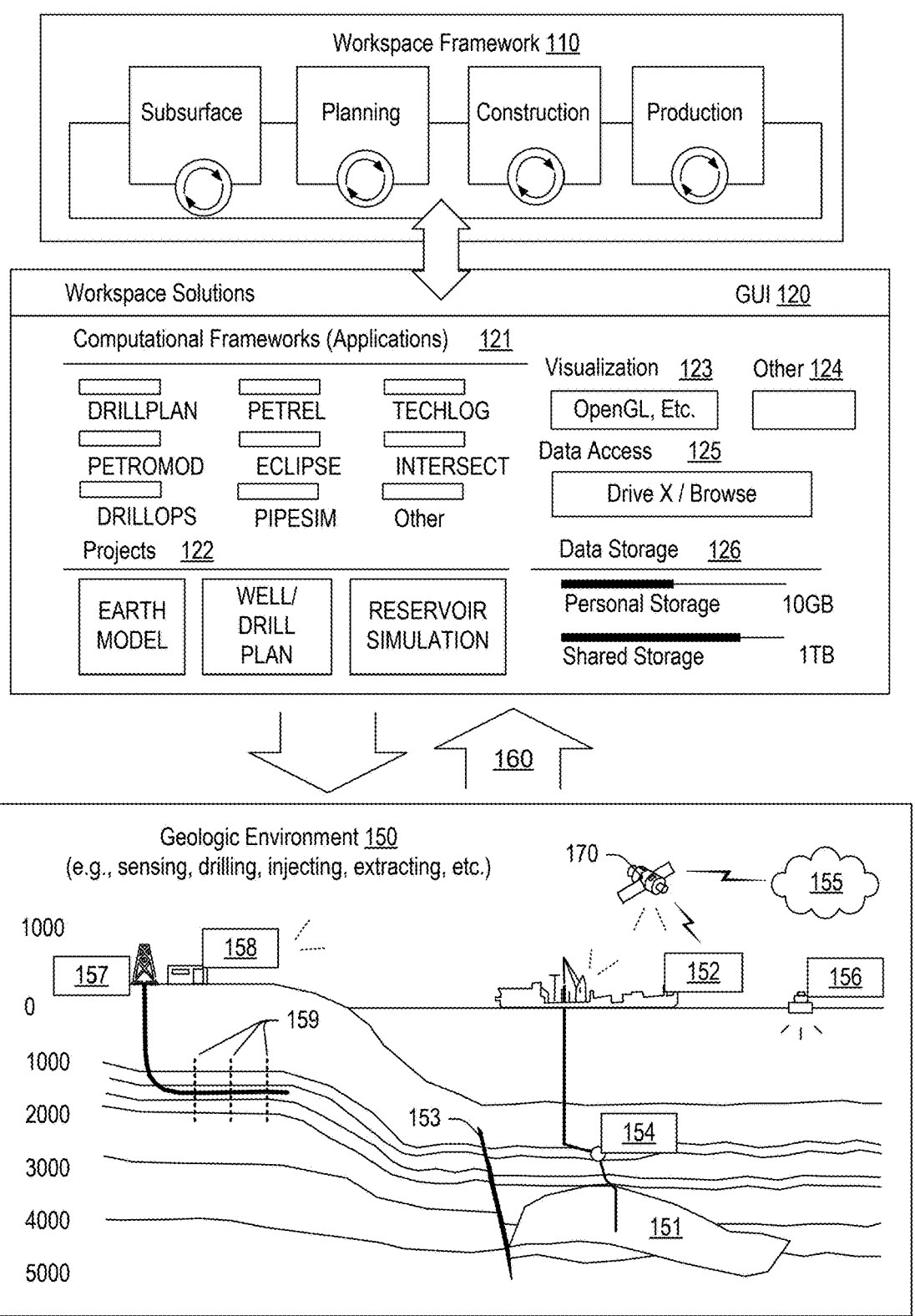
FIG. 1 illustrates examples of equipment in a geologic environment.

FIG. 1 shows an example of a system 100 that includes a workspace framework 110 that may provide for instantiation of, rendering of, interactions with, etc., a graphical user interface (GUI) 120. In the example of FIG. 1, the GUI 120 may include graphical controls for computational frameworks (e.g., applications, etc.) 121, projects 122, visualization features 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite 170 in communication with the network 155 that may be configured for communications, noting that the satellite 170 may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc., for fracturing, seismic sensing, analysis of seismic data, assessment of one or more fractures, etc.

In the example of FIG. 1, the GUI 120 shows some examples of computational frameworks, including the DRILLPLAN, DRILLOPS, PETREL, TECHLOG, PETROMOD, ECLIPSE, PIPESIM, and INTERSECT frameworks (SLB, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The DRILLOPS framework may execute a digital drilling plan and ensure plan adherence, while delivering goal-based automation. The DRILLOPS framework may generate activity plans automatically for individual operations, whether they are monitored and/or controlled on the rig or in town. Automation may utilize data analysis and learning systems to assist and optimize tasks, such as, for example, setting ROP to drilling a stand. A preset menu of automatable drilling tasks may be rendered, and, using data analysis and models, a plan may be executed in a manner to achieve a specified goal, where, for example, measurements may be utilized for calibration. The DRILLOPS framework provides flexibility to modify and replan activities dynamically, for example, based on a live appraisal of various factors (e.g., equipment, personnel, and supplies). Well construction activities (e.g., tripping, drilling, cementing, etc.) may be continually monitored and dynamically updated using feedback from operational activities. The DRILLOPS framework may provide for various levels of automation based on planning and/or re-planning (e.g., via the DRILLPLAN framework), feedback, etc.

The PETREL framework may be part of the DELFI environment for utilization in geosciences and geoengineering, for example, to analyze subsurface data from exploration to production of fluid from a reservoir. The DELFI cognitive exploration and production (E&P) environment (SLB, Houston, Texas), referred to herein as the DELFI environment or DELFI framework, is a secure, cognitive, cloud-based collaborative environment that integrates data and workflows with digital technologies, such as artificial intelligence and machine learning.

The PETREL framework provides components that allow for optimization of various exploration, development and production operations. The PETREL framework includes seismic to simulation software components that may output information for use in increasing reservoir performance, for example, by improving asset team productivity. Through use of such a framework, various professionals (e.g., geophysicists, geologists, and reservoir engineers) may develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

The TECHLOG framework may handle and process field and laboratory data for a variety of geologic environments (e.g., deepwater exploration, shale, etc.). The TECHLOG framework may structure wellbore data for analyses, planning, etc.

The PETROMOD framework provides petroleum systems modeling capabilities that may combine one or more of seismic, well, and geological information to model the evolution of a sedimentary basin. The PETROMOD framework may predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework may produce reliable results, which may be continuously updated by real-time data exchanges (e.g., from one or more types of data acquisition equipment in the field that may acquire data during one or more types of field operations, etc.). The INTERSECT framework may provide completion configurations for complex wells where such configurations may be built in the field, may provide detailed enhanced-oil-recovery (EOR) formulations where such formulations may be implemented in the field, may analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases. For example, a workflow may utilize one or more of the DELFI environment on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 may be utilized for directing, controlling, etc., one or more processes in the geologic environment 150 and, feedback 160, may be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G frameworks (e.g., consider the PETREL framework, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process may implement one or more of various features that may be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. Such an approach may provide for compatibility of devices, frameworks, etc., with respect to one or more sets of instructions.

As an example, visualization features may provide for visualization of various earth models, properties, etc., in one or more dimensions. As an example, visualization features may provide for rendering of information in multiple dimensions, which may optionally include multiple resolution rendering. In such an example, information being rendered may be associated with one or more frameworks and/or one or more data stores. As an example, visualization features may include one or more control features for control of equipment, which may include, for example, field equipment that may perform one or more field operations. As an example, a workflow may utilize one or more frameworks to generate information that may be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results may be utilized to plan, simulate, perform, etc., one or more operations for production of fluid from a reservoir (e.g., reservoir rock, etc.).

As an example, a model may be a simulated version of a geologic environment. As an example, a simulator may include features for simulating physical phenomena in a geologic environment based at least in part on a model or models. A simulator, such as a reservoir simulator, may simulate fluid flow in a geologic environment based at least in part on a model that may be generated via a framework that receives seismic data. A simulator may be a computerized system (e.g., a computing system) that may execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that may be based on interpretation of seismic and/or other data. A spatial model may be a cell-based model where cells are defined by a grid (e.g., a mesh). A cell in a cell-based model may represent a physical area or volume in a geologic environment where the cell may be assigned physical properties (e.g., permeability, fluid properties, etc.) that may be germane to one or more physical phenomena (e.g., fluid volume, fluid flow, pressure, etc.). A reservoir simulation model may be a spatial model that may be cell-based.

While several simulators are illustrated in the example of FIG. 1, one or more other simulators may be utilized, additionally or alternatively. For example, consider the VISAGE geomechanics simulator (SLB, Houston Texas) or the PIPESIM network simulator (SLB, Houston Texas), etc. As an example, the KINETIX framework (SLB Houston, Texas) may be utilized for reservoir-centric stimulation-to-production workflows that may integrate geology, petrophysics, completion engineering, reservoir engineering, and geomechanics to assist in optimization of completion and fracturing designs for a well, a pad, or a field, etc. From 1D logs and simple geometric completions to full 3D mechanical and petrophysical models coupled with the INTERSECT simulator and the VISAGE geomechanics simulator, the KINETIX framework provides various options, including automated parallel processing (e.g., consider cloud platform computing, etc.).

As an example, a workflow may utilize one or more types of data for one or more processes (e.g., stratigraphic modeling, basin modeling, completion designs, drilling, production, injection, etc.). As an example, one or more tools may provide data that may be used in a workflow or workflows that may implement one or more frameworks (e.g., PETREL, TECHLOG, PETROMOD, ECLIPSE, etc.).

In the example of FIG. 1, drilling may be performed in the geologic environment 150, for example, to access the reservoir 151, which may be accessed from land or offshore. In FIG. 1, the downhole equipment 154 may be, for example, part of a bottom hole assembly (BHA). The BHA may be used to drill a well. The downhole equipment 154 may communicate information to equipment at the surface, and may receive instructions and information from the equipment at the surface. During a well construction process, a variety of operations (such as cementing, wireline evaluation, testing, etc.) may be conducted. In such embodiments, data collected by tools and sensors and used for reasons such as reservoir characterization may be collected and transmitted.

A well may include a substantially horizontal portion (e.g., lateral portion) that may intersect with one or more fractures. For example, a well in a shale formation may pass through natural fractures, artificial fractures (e.g., hydraulic fractures), or a combination thereof. Such a well may be constructed using directional drilling techniques as described herein. However, these same techniques may be used in connection with other types of directional wells (such as slant wells, S-shaped wells, deep inclined wells, and others) and are not limited to horizontal wells.

As an example, a platform, such as, for example, the LUMI platform (SLB, Houston, Texas) may be utilized. The LUMI platform includes features that provide for artificial intelligence solutions as may be integrated with data management capabilities. The LUMI platform provides for flexible deployment options and an open, secure, and modular architecture, for example, to empower data-driven decision-making. The LUMI platform is operable with the DELFI environment and, hence, one or more of various frameworks. While various platforms, environments, frameworks, libraries, etc., are mentioned, a framework may be operable in an agnostic manner, for example, to be compatible with one or more other platforms, environments, frameworks, libraries, technologies, etc.

Figure 2:
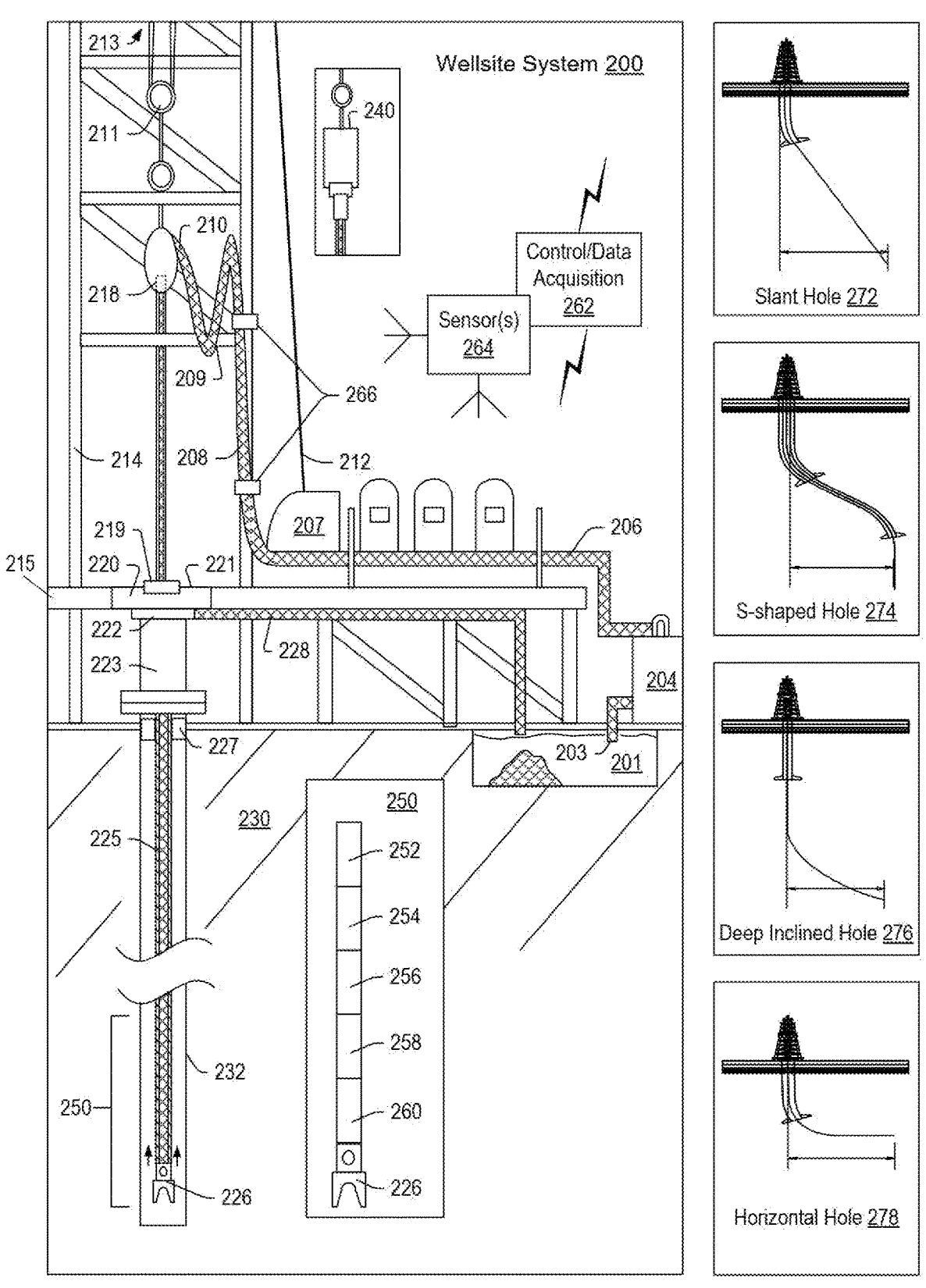
FIG. 2 illustrates an example of a system and examples of types of holes.

FIG. 2 shows an example of a wellsite system 200 (e.g., at a wellsite that may be onshore or offshore). As shown, the wellsite system 200 may include a mud tank 201 for holding mud and other material (e.g., where mud may be a drilling fluid that may help to transport cuttings, etc.), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212, a derrick 214, a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling or one or more other types of drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 may provide for operation of the drillstring 225 and other operations. As shown, the wellsite system 200 includes the platform 215 and the derrick 214 positioned over the borehole 232. As mentioned, the wellsite system 200 may include the rotary table 220 where the drillstring 225 passes through an opening in the rotary table 220.

As shown in the example of FIG. 2, the wellsite system 200 may include the kelly 218 and associated components, etc., or a top drive 240 and associated components. As to a kelly example, the kelly 218 may be a square or hexagonal metal/alloy bar with a hole drilled therein that serves as a mud flow path. The kelly 218 may be used to transmit rotary motion from the rotary table 220 via the kelly drive bushing 219 to the drillstring 225, while allowing the drillstring 225 to be lowered or raised during rotation. The kelly 218 may pass through the kelly drive bushing 219, which may be driven by the rotary table 220. As an example, the rotary table 220 may include a master bushing that operatively couples to the kelly drive bushing 219 such that rotation of the rotary table 220 may turn the kelly drive bushing 219 and hence the kelly 218. The kelly drive bushing 219 may include an inside profile matching an outside profile (e.g., square, hexagonal, etc.) of the kelly 218; however, with slightly larger dimensions so that the kelly 218 may freely move up and down inside the kelly drive bushing 219.

As to a top drive example, the top drive 240 may provide functions performed by a kelly and a rotary table. The top drive 240 may turn the drillstring 225. As an example, the top drive 240 may include one or more motors (e.g., electric and/or hydraulic) connected with appropriate gearing to a short section of pipe called a quill, that in turn may be screwed into a saver sub or the drillstring 225 itself. The top drive 240 may be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 may hold mud, which may be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via the lines 206, 208 and 209 to a port of the kelly 218 or, for example, to a port of the top drive 240. The mud may then flow via a passage (e.g., or passages) in the drillstring 225 and out of ports located on the drill bit 226 (see, e.g., a directional arrow). As the mud exits the drillstring 225 via ports in the drill bit 226, it may then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud may be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more components of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud may cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring may include a plurality of tools.

As to an RSS, it involves technology utilized for direction drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling may commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; noting that a mud motor may present some challenges depending on factors such as rate of penetration (ROP), transferring weight to a bit (e.g., weight on bit, WOB) due to friction, etc. A mud motor may be a positive displacement motor (PDM) that operates to drive a bit during directional drilling. A PDM operates as drilling fluid is pumped through it where the PDM converts hydraulic power of the drilling fluid into mechanical power to cause the bit to rotate. A PDM may operate in a so-called sliding mode, when the drillstring is not rotated from the surface; noting that a top drive may oscillate the drillstring to reduce friction (e.g., turning clockwise and counterclockwise) during slide drilling.

An RSS may drill directionally where there is continuous rotation from surface equipment, which may alleviate the sliding of a steerable motor (e.g., a PDM). An RSS may be deployed when drilling directionally (e.g., deviated, horizontal, or extended-reach wells). An RSS may aim to minimize interaction with a borehole wall, which may help to preserve borehole quality. An RSS may aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and may contain one or a plurality of selected types of logging tools (e.g., NMR unit or units, etc.). It will also be understood that one or more LWD and/or MWD modules may be employed at one or more positions. An LWD module may include capabilities for measuring, processing, and storing information, as well as for communicating with the surface equipment. In the illustrated example, the LWD module 254 may include a seismic measuring device (e.g., sonic, etc.), an NMR measuring device, a resistivity measuring device, etc.

The MWD module 256 may be housed in a suitable type of drill collar and may contain one or more devices for measuring characteristics of the drillstring 225 and the drill bit 226. As an example, the MWD module 256 may include equipment for generating electrical power, for example, to power various components of the drillstring 225. As an example, the MWD module 256 may include the telemetry equipment 252, for example, where the turbine impeller may generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

As an example, one or more measuring devices may be included in a drillstring (e.g., a BHA, etc.) where, for example, measurements may support one or more of geo-steering, geostopping, trajectory optimization, etc.

FIG. 2 also shows some examples of types of holes that may be drilled. For example, consider a slant hole 272, an S-shaped hole 274, a deep inclined hole 276 and a horizontal hole 278. In various instances, a borehole may be referred to as a high-angle (HA) borehole or a horizontal (HZ) borehole. An HA borehole may be defined as having a section at an angle deviating from vertical, for example, consider an angle greater than 45 degrees, which may exceed 60 degrees and may approach 90 degrees; noting that an HZ borehole may also be defined as having a section at an angle deviating from vertical, for example, consider an angle more than approximately 80 degrees.

As an example, a drilling operation may include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees. As an example, a trajectory and/or a drillstring may be characterized in part by a dogleg severity (DLS), which may be a two-dimensional parameter specified in degrees per 30 meters (e.g., or degrees per 100 feet).

As an example, a directional well may include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, consider a drillstring that may include a positive displacement motor (PDM).

As an example, a system may be a steerable system and include equipment to perform a method such as geosteering. As mentioned, a steerable system may be or include an RSS. As an example, a steerable system may include a PDM and/or a turbine on a lower part of a drillstring which, just above a drill bit, a bent sub may be mounted. Geosteering equipment of a drillstring may include one or more geosteering actuators that may provide for orienting a drill bit of the drillstring. For example, an actuator that may include a piston that moves a pad for providing a force that may be exerted against a borehole wall thus steering a bottom hole assembly (e.g., orienting a drill bit of the bottom hole assembly). As an example, an actuator may be a bent downhole motor, which may be actuated via one or more processes. As an example, a bent drilling motor may be used with a fixed bend that cannot be varied during normal operation or with a variable bend that, for example, may be varied based on a geosteering command. As an example, for a variable bend drilling motor, one or more actuators may be included that may be configured to create or vary a bend, thereby affecting the steering behavior of the steering system. As an example, an actuator may be a downhole actuator that may adjust orientation downhole and/or an actuator may be a surface actuator that may perform an action uphole (e.g., at surface) to adjust orientation downhole.

As an example, above a PDM and/or other directional drilling equipment, MWD equipment that provides real time or near real time data of interest (e.g., inclination, direction, pressure, temperature, real weight on the drill bit, torque stress, etc.) and/or LWD equipment may be installed. As to the latter, LWD equipment may make it possible to acquire for sending to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, may allow for implementing a geosteering method. Such a method may include navigating a subsurface environment, for example, to follow a desired route to reach a desired target or targets.

As an example, a drillstring may include one or more of an azimuthal density neutron (ADN) tool for measuring density and porosity; a MWD tool for measuring inclination, azimuth and shocks; a compensated dual resistivity (CDR)

tool for measuring resistivity and gamma ray related phenomena; a combinable magnetic resonance (CMR) tool for measuring properties (e.g., relaxation properties, etc.); one or more variable gauge stabilizers; one or more bend joints; and a geosteering tool, which may include a motor and optionally equipment for measuring and/or responding to one or more of inclination, resistivity and gamma ray related phenomena.

As an example, a tool such as the ECOSCOPE tool (SLB, Houston, Texas) may be utilized to acquire measurements. Such a tool may include one or more pulsed neutron generators (PNGs) and associated detectors. Such a tool may include features for one or more of resistivity, neutron porosity, azimuthal gamma ray, density, elemental capture spectroscopy and sigma measurements. For example, consider features for one or more of 2 MHz and 400 kHz propagation resistivity, elemental capture spectroscopy, neutron-gamma density, capture cross section (sigma), azimuthal bulk density, azimuthal photoelectric factor, azimuthal natural gamma ray, density caliper, ultrasonic caliper, annular pressure and temperature while drilling, triaxial shocks and vibration, and near-bit borehole inclination. Such a tool may be operatively coupled to one or more telemetry systems that may provide for real-time acquisition and, for example, real-time decision making, rendering of graphics, etc. As an example, such a tool may be operatively coupled to one or more types of circuitries, which may, for example, perform computations downhole using measurements acquired downhole.

As an example, a tool such as the PERISCOPE tool (SLB, Houston, Texas) may be utilized to acquire measurements. For example, consider measurements such as resistivity, which may be acquired using one or more types of receivers. As an example, a receiver may be or include an antenna. For example, the PERISCOPE tool may include tilted, axial, and transverse antenna. As an example, data acquired from such a tool may provide for identification of layers, number of layers, position of a layer or layers, within a distance of 1 meter or more (e.g., up to or more than 8 meters).

As to sigma measurements (e.g., sigma data), sigma is the macroscopic cross section for the absorption of thermal neutrons, or capture cross section, of a volume of matter, measured in capture units (c.u.). A sigma log is the principal output of a pulsed neutron capture log, which may be used for one or more purposes.

As an example, one or more types of nuclear measurements may be acquired by one or more tools where such nuclear measurements may include one or more of electron density ($\rho_e$), hydrogen index (HI), and thermal neutron capture cross section (sigma or $\Sigma$).

As an example, geosteering may include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 may include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 may be provided for tracking pipe, tracking movement of at least a portion of a drillstring, etc.

As an example, the system 200 may include one or more sensors 266 that may sense and/or transmit signals to a fluid conduit such as a drilling fluid conduit (e.g., a drilling mud conduit). For example, in the system 200, the one or more sensors 266 may be operatively coupled to portions of the standpipe 208 through which mud flows. As an example, a downhole tool may generate pulses that may travel through the mud and be sensed by one or more of the one or more sensors 266 (e.g., consider mud-pulse telemetry). In such an example, the downhole tool may include associated circuitry such as, for example, encoding circuitry that may encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 may include a transmitter that may generate signals that may be transmitted downhole via mud (e.g., drilling fluid) as a transmission medium.

Analysis of formation information acquired by one or more tools may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). A reservoir may be a porous formation where fluid may be within various pores of the porous formation and amenable to movement (e.g., to produce fluid from the reservoir). As an example, information acquired by a tool or tools may be analyzed using a framework such as the TECHLOG framework (SLB, Houston, Texas). As an example, the TECHLOG framework may be interoperable with one or more other frameworks such as, for example, the PETREL framework (SLB, Houston, Texas). As an example, a computational environment such as, for example, the DELFI environment (SLB, Houston, Texas) may be utilized, which may provide for utilization of the PETREL framework and other frameworks, optionally in interrelated manners.

Figure 3:
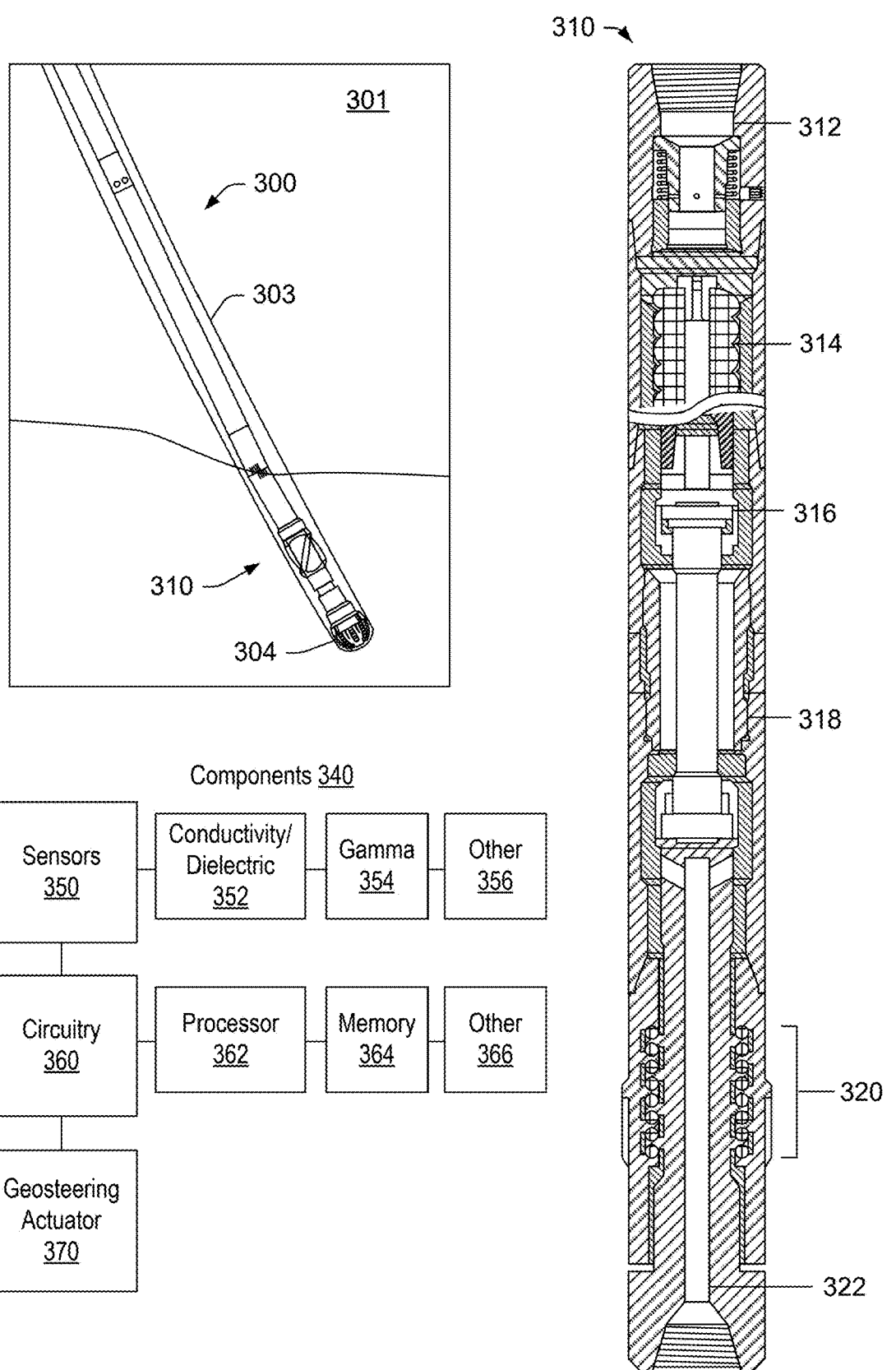
FIG. 3 illustrates an example of a geologic environment with a borehole and an example of a portion of a drillstring that may include various components.

FIG. 3 shows an example of a drilling assembly 300 in a geologic environment 301 that includes a borehole 303 where the drilling assembly 300 (e.g., a drillstring) includes a bit 304 and a motor section 310 where the motor section 310 may drive the bit 304 (e.g., cause the bit 304 to rotate and deepen the borehole 303).

As shown, the motor section 310 may include a dump valve 312, a power section 314, a surface-adjustable bent housing 316, a transmission assembly 318, a bearing section 320 and a drive shaft 322, which may be operatively coupled to a bit such as the bit 304. The motor section 310 of FIG. 3 may be a POWERPAK family motor section (SLB, Houston, Texas) or another type of motor section.

A power section may convert hydraulic energy from drilling fluid into mechanical power to turn a bit. For example, consider the reverse application of the Moineau pump principle. During operation, drilling fluid may be pumped into a power section at a pressure that causes the rotor to rotate within the stator where the rotational force is transmitted through a transmission shaft and drive shaft to a bit.

FIG. 3 also shows examples of components 340 such as, for example, sensors 350, circuitry 360 and a geosteering actuator 370. As shown, the sensors 350 may include a conductivity and dielectric sensor 352, a gamma sensor 354 and one or more other sensors 356. As shown, the circuitry 360 may include a processor 362, memory 364 and one or more other types of circuitries 366. As shown, the geosteering actuator 370 may be operatively coupled to the circuitry 360 and the sensors 350. For example, the circuitry 360 may process signals (e.g., measurements or sensor data) of the sensors 350 to generate one or more commands for actuation of the geosteering actuator 370. In the example of FIG. 3, the geosteering actuator 370 may provide for one or more of PDM actuation and bent sub actuation, for example, to orient the drill bit 304.

FIG. 4 shows an example of a drilling assembly 400 (e.g., a portion of a drillstring) that includes a bit 404 and a rotary steerable system (RSS) 410. As mentioned, an RSS may be utilized for directional drilling, including geosteering. As an example, the RSS 410 may include one or more features of a POWERDRIVE ARCHER RSS (SLB, Houston, Texas).

FIG. 4 also shows examples of components 440 such as, for example, sensors 450, circuitry 460 and a geosteering actuator 470. As shown, the sensors 450 may include a conductivity and dielectric sensor 452, a gamma sensor 454 and one or more other sensors 456. As shown, the circuitry 460 may include a processor 462, memory 464 and one or more other types of circuitries 466. As shown, the geosteering actuator 470 may be operatively coupled to the circuitry 460 and the sensors 450. For example, the circuitry 460 may process signals (e.g., measurements or sensor data) of the sensors 450 to generate one or more commands for actuation of the geosteering actuator 470. In the example of FIG. 4, the geosteering actuator 470 may provide for RSS actuation, for example, to orient the drill bit 404.

As an example, the drilling assembly 400 may include one or more of a near-bit continuous inclination and azimuth measurement unit or sub, a near-bit azimuthal gamma ray measurement unit or sub, and one or more other types of measurement units or subs.

As an example, a drilling assembly may include one or more types of circuitries. For example, consider a processing unit with a processor and associated memory where one or more sensors may generate signals that may be received by the processing unit. In such an example, the processing unit may perform computations that may utilize information in the signals (e.g., measurements, etc.) to generate commands for geosteering. In such an example, a drilling assembly may be capable of performing, at least in part, downhole geosteering according to geosteering commands generated downhole without transmission of information uphole to a controller and subsequent transmission of information downhole to geosteering equipment. In such an example, at least some types of geosteering processes may be performed more rapidly in response to sensor signals. For example, consider sensor signals indicative of one or more of presence of clay, an amount of clay, a type of clay, and a boundary as an interface between layers, where downhole geosteering equipment may act to steer a drill bit based on one or more of such sensor signals.

As an example, an electromagnetic conductivity measurement tool (ECM tool) may be implemented as a wireline tool and/or implemented as a LWD tool to generate permittivity and conductivity measurements at each frequency for one or more frequencies, which may be interpreted using a petrophysical model. In such an example, output parameters of the model may include water-filled porosity (hence water saturation if the total porosity is known) and water salinity. As an example, parameters that may be output using ECM tool measurements (e.g., induction, propagation, etc.) may include one or more of bulk formation cation exchange capacity (CEC), water saturation ($S_w$), connate water salinity, Archie cementation exponent and Archie saturation exponent.

Figure 5:
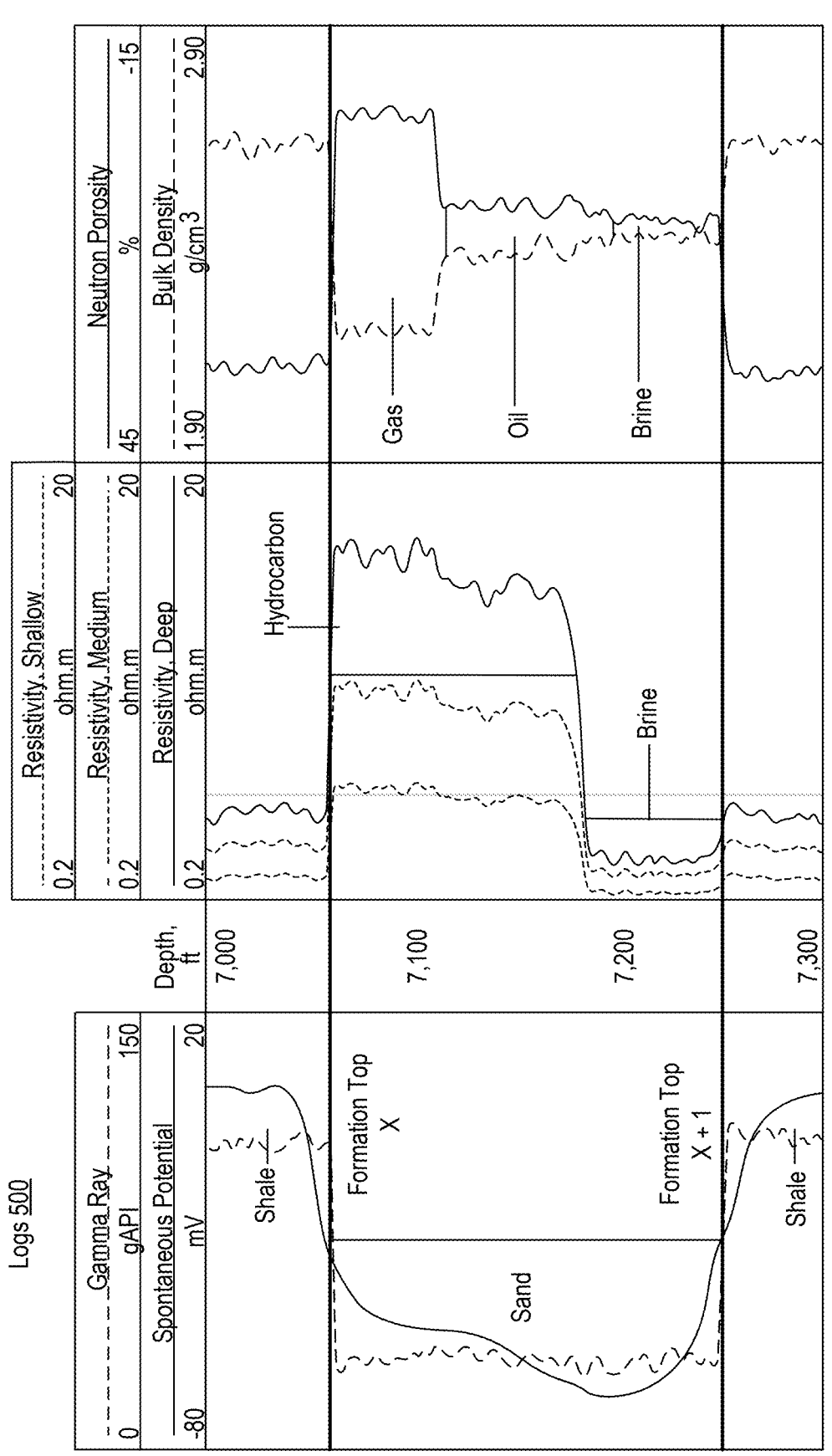
FIG. 5 illustrates examples of logs.

FIG. 5 shows example logs 500 that include various measurements acquired by one or more downhole tools. For example, the logs 500 include spontaneous potential (mV), gamma ray (gAPI), resistivity (ohm·m), neutron porosity (percent), and bulk density (g·cm$^{-3}$). The gamma ray response (track 1) distinguishes the low gamma ray value of sand from the higher value of shale. The spontaneous potential curve generally follows a trend similar to that of the gamma ray. The next column, referred to as a depth track (track 2), indicates the depth at which measurements have been acquired. Across the sandstone formation, the resistivity measurements (track 3) are noticeably higher in the hydrocarbon zone than in the water-saturated zone in the lower part of the sand. Both neutron porosity and bulk density (track 4) provide measures of porosity. Within the hydrocarbon-bearing zone, the separation of the curves varies depending on the type of fluid encountered.

As an example, logs may be acquired as to formation parameters versus depth where, from such logs, lithologies may be identified that may differentiate various type of rock. For example, consider differentiating between porous and nonporous rock, which may provide for identification of one or more pay zones in subsurface formations. In a given field or local geological province, certain formations may have distinctive characteristics that appear similar from one well to the next, providing geologists with a basis for locating the depths of various strata in the subsurface. For example, consider identification of formation tops, which may be tracked from logs of one well to logs of another well. In the example of FIG. 5, the logs 500 include variations with respect to shale and sand where a first interface may be referred to as formation top X and a second interface may be referred to as formation top X+1. In such an example, an interface may be referred to as a boundary, which may also be identifiable in one or more other types of data such as, for example, seismic data. As an example, a workflow may include correlation of seismic picks to geologic picks, such as formation tops interpreted from well logs, to improve model building, etc.

As to types of formation materials, as mentioned, the logs 500, such as the gamma ray data, refer to shale and sand. Shale may be defined as a fine-grained, fissile, detrital sedimentary rock formed by consolidation of clay- and silt-sized particles into thin, relatively impermeable layers. Various clay types and volumes can influence quality of a reservoir from a petrophysical and geomechanical perspective. For example, quality of a shale reservoir may depend on thickness and extent, organic content, thermal maturity, depth and pressure, fluid saturations, and permeability, amongst other factors. As to clay, it may be defined as a fine-grained sediment while sand may be defined to be larger than silt but smaller than a granule according to the Udden-Wentworth scale; noting that sand may also be a term used for quartz grains or for sandstone. As to sandstone, it may be of a relatively high porosity and permeability suitable for forming reservoir rocks. As explained, shale can be formed at least in part by clay and be a clay-rich sedimentary rock.

For example, various shales may be composed of approximately 50 percent by weight of clay to approximately 60 percent by weight of clay (e.g., clay minerals). More generally, clay may be utilized as a class of formation material, which may include shale as a subclass.

In 1942, the relationship between resistivity, porosity and water saturation (and thus its inverse: hydrocarbon saturation) was established by G. E. Archie, paving the way for a quantitative evaluation of formation properties using well logs. The Archie equation or relationship may be expressed between the formation factor (F) and porosity (phi) as $F = 1/phi^m$, where the porosity exponent, m, is a constant for a particular formation or type of rock, which may be referred to as the Archie cementation exponent (e.g., consider values between 1.8 and 2.0 for consolidated sandstones, and close to 1.3 for loosely consolidated sandstones). While the Archie equation is mentioned, one or more other equations may be utilized, for example, consider one or more of the following types of water saturation equations: Archie, Simandoux, Indonesia, Fertl, and SW ratio, and modifications thereof.

As to resistivity of rock, it is a measure of the degree to which rock may impede the flow of an electric current. As shown, resistivity may be expressed in units of ohm·m, noting that it may be measured in ohm·m$^2$/m. The reciprocal of resistivity is conductivity, which is typically expressed in terms of millimhos or mmhos. The ability to conduct electrical current is a function of the conductivity of water contained in pore space of rock. Pure water does not conduct electricity; whereas, salt ions found in most formation waters do provide for conduction of electricity. Brine-saturated rocks tend to have high conductivity and low resistivity, which may be seen in the resistivity log data of FIG. 5 at depths about 7,200 feet. Hydrocarbons, which are nonconductive, cause resistivity values to increase as the pore spaces within a rock become more saturated with oil or gas.

As to spontaneous potential (SP), it is a measurement of voltage difference between a movable electrode in a wellbore and a fixed electrode at the surface. This electrical potential is primarily generated as a result of exchanges of fluids of different salinities (e.g., salinity of drilling fluid and salinity of formation fluid). During the course of drilling, permeable rock within a wellbore may become invaded by drilling mud filtrate where, if the filtrate is less saline than formation fluid, negatively charged chlorine ions from formation water may cause the SP curve to deflect to the left from an arbitrary baseline established across impermeable shale formations. The magnitude of the deflection is influenced by a number of factors, including permeability, porosity, formation water salinity and mud filtrate properties. Permeable formations filled with water that is fresher than the filtrate will cause the curve to deflect to the right. Hence, by the nature of deflections, an SP log may indicate which formations are permeable. A permeable formation with a high resistivity may be more likely to contain hydrocarbons.

As shown in the logs 500, a gamma ray (GR) log may be included, along with one or more of multiple resistivity logs and porosity readings obtained from density, neutron, and/or sonic logs. As to GR log acquisition, a downhole tool may measure naturally occurring radioactivity from a formation where a GR log may help differentiate non-reservoir rocks (e.g., clays, including shales) from reservoir rocks (e.g., sandstone and carbonates). Shales and clays tend to be derived from rocks that tend to contain naturally occurring radioactive elements, primarily potassium, uranium and thorium. As a consequence, clays are more radioactive than clean sandstones and carbonates. Quartz and calcium carbonate produce almost no radiation. A log analysis may look for formations with low background radiation because they may have potential to contain moveable hydrocarbons.

Various resistivity tools may measure a formation at different depths of investigation (e.g., shallow, medium and deep). A resulting log may present shallow, medium and deep tracks. A shallow curve, charting the smallest radius of investigation, may indicate resistivity of a flushed zone surrounding a borehole; a medium curve may indicate resistivity of an invaded zone; and a deepest curve may indicate resistivity of an uncontaminated zone, which may be presumed to be a true formation resistivity; noting that such a curve may still be affected by the presence of mud filtrate. By evaluating separations between curves at different depths of investigation, an analysis may provide an estimation of a diameter of invasion by mud filtrate and may be able to determine which zones are more permeable than others.

As to formation bulk density, it provides a measure of porosity. The bulk density of a formation is based on a ratio of a measured interval's mass to its volume. In general, rock porosity tends to be inversely related to rock density. Formation bulk density may be derived from electron density of a formation. Such a measurement may be obtained by a logging device that emits gamma rays into a formation. Gamma rays may collide with electrons in a formation, giving off energy and scattering in a process known as Compton scattering. The number of such collisions is directly related to the number of electrons in a formation. In low-density formations, more of these scattered gamma rays are able to reach a detector than in formations of higher density.

As hydrogen tends to be a major constituent of both water and hydrocarbons and because water and hydrocarbons concentrate in rock pores, the concentration of hydrogen atoms may be used to determine fluid-filled porosity of a formation. Hydrogen atoms have nearly the same mass as neutrons. Neutron logging tools emit neutrons using a chemical source or an electronic neutron generator. When these neutrons collide with hydrogen atoms in a formation, they lose the maximal energy, slow down and eventually reach a very-low-energy state (e.g., a thermal state). The rate at which neutrons reach the thermal state is proportional to the hydrogen concentration or index (HI). Various neutron porosity tools measure HI, which may be converted to neutron porosity.

As an example, a sonic log may be used to determine porosity by charting the speed of a compressional sound wave as it travels through a formation. Interval transit time ($\Delta t$), measured in microseconds per meter or foot and often referred to as slowness, is the reciprocal of velocity. Lithology and porosity affect $\Delta t$. Dense, consolidated formations characterized by compaction at depth generally result in a faster (shorter) $\Delta t$ while fluid-filled porosity results in a slower (longer) $\Delta t$. Measurements may be affected by formation and borehole conditions. In various instances, quality control processes may be performed on data. As an example, gas, fractures and lack of compaction may demand adjustments to be applied to a sonic log. Lithologies affect the density, neutron and sonic logs. Invasion of mud filtrate into porous formations affects resistivity readings, and temperature affects the resistivity of both filtrate and saline formation water.

As an example, data from a downhole tool may be transmitted to surface equipment and/or other downhole equipment using one or more types of telemetry technologies. For example, consider mud-pulse telemetry, wire telemetry, fiber telemetry, etc. As an example, data from a downhole tool may be transmitted along with one or more timestamps. As an example, surface equipment may provide for relating a timestamp with a depth, which may be a measured depth. For example, in the logs 500 of FIG. 5, downhole data with timestamps may be transmitted to surface equipment where the surface equipment provides for assigning appropriate depths to the downhole data (see, e.g., depth track as listed in units of feet). As an example, surface equipment may be utilized to transmit depth data downhole where such depth data may be associated with downhole data, utilized to calibrate one or more tools, etc.

As an example, directional drilling may involve drilling a number of different sections such as, for example, a build section, a landing section and a lateral section. In such an example, a build section may be a portion of a directional wellbore curve that may extend from a kick-off point (KOP) to another point. As to a landing section, it may be a portion of a wellbore beyond a build section where steering may be controlled in an effort to hit a target. A landing section may be composed of segments such as, for example, an upper segment, which may be referred to as an approach section, and a lower segment, which may be referred to as a taper section. In the approach section, the magnitude of changes may tend to be greater than in the taper section as the taper section may aim to form a wellbore that smoothly transition at the end of the landing as the drillstring enters a target zone (e.g., a target formation). As to a lateral section, it may be a portion of a wellbore that extends substantially horizontally from an end of a landing taper, out to an end of the wellbore. A course change within a lateral section may affect a reservoir for better or for worse. As an example, a lateral section may be drilled using a BHA, which may include a mud motor, an RSS, etc. In various scenarios, inclination and/or azimuth of a lateral section may be maintained through a combination of sliding and rotating of a drillstring.

As an example, directional drilling may include geosteering as part of a landing job (e.g., drilling a landing section). In a landing job for a well, estimated well tops in the current well may lack accuracy. For example, estimated well tops may be rough estimates based on data from one or more offset wells as may be visually assessed by one or more individuals. As explained, a drillstring may include one or more logging tools to acquire measurements while drilling (e.g., MWD, LWD, etc.). Thus, when a current well is being drilled, real-time log measurements may be acquired. Where such measurements are available, an assessment may involve performing a comparison of a current well's log data and log data from one or more other wells (e.g., log data from one or more offset wells) to generate a more accurate estimate of one or more well tops. Such an assessment may be referred to as log correlation during geosteering. During directional drilling, accurate estimation of well tops may provide for decision making. For example, consider decision making as to whether drilling has arrived one or more points along a trajectory (e.g., planned trajectory points, safety points, etc.). In various instances, a point may be associated with an operation (e.g., a downhole operation, etc.) that is to be performed. During a landing job, a decision may relate to termination of a landing section or a transition from one landing segment to another.

As explained, directional drilling may involve performing log correlation visually, for example, using a number of logs rendered to a display. In such an example, one or more well placement engineers may interact with a graphical user interface that may provide for rendering logs to a display and manually adjusting positions of logs with respect to one another, picking well tops, etc.

As an example, a framework may include one or more components and/or operatively coupled to one or more components for implementing an integrated predictive geosteering workflow. In such an example, components may provide for executing a structural update, a resistivity forward prediction and an uncertainty prediction.

As an example, a framework may include one or more plug-in components. For example, consider one or more framework plug-in components. As an example, a framework may operate in conjunction with one or more plug-ins. For example, a plug-in may instruct an instance of a framework as to performance of one or more of techniques (e.g., import, export, computation, etc.). As an example, a plug-in may provide for launching one or more components within a framework environment, for example, executing using local resources and/or executing using remote resources (e.g., consider one or more of a workstation, a networked HPC cluster, a cloud platform, etc.). As an example of a plug-in for a framework, consider a multi-physics plug-in, which provides tools to integrate electromagnetic (EM) and potential fields data with geological knowledge, seismic data, and well logs. Such a plug-in may include components for magnetotellurics (MT), controlled source EM (CSEM), gravity and magnetics (GM), etc.

As an example, a workflow may be implemented for execution in real-time using at least in part field data. In such an example, components may be coordinated to expedite execution, for example, by reducing number of calls and responses, logistic waiting times, etc. For example, consider a plug-in that may be a unified plug-in for implementation of sub-workflows in an integrated predictive geosteering workflow (IPG workflow). In such an example, the sub-workflows may include a structural update sub-workflow, a resistivity forward prediction sub-workflow and an uncertainty prediction sub-workflow. In such an example, an IPG workflow may be executed using a one-click approach, for example, after setting of inputs, which may be or may include common inputs. As an example, a framework may provide a set of advanced settings for advanced users to investigate more detailed aspects of each sub-workflow and, for example, a dependency management component that may re-run corresponding sub-workflows automatically according to input and/or one or more setting changes. As an example, a framework may include one or more visualization components. For example, consider a component that may provide for implementing a method that creates visualizations of results from a number of sub-workflows, which may provide for improved interpretations.

Figure 6:
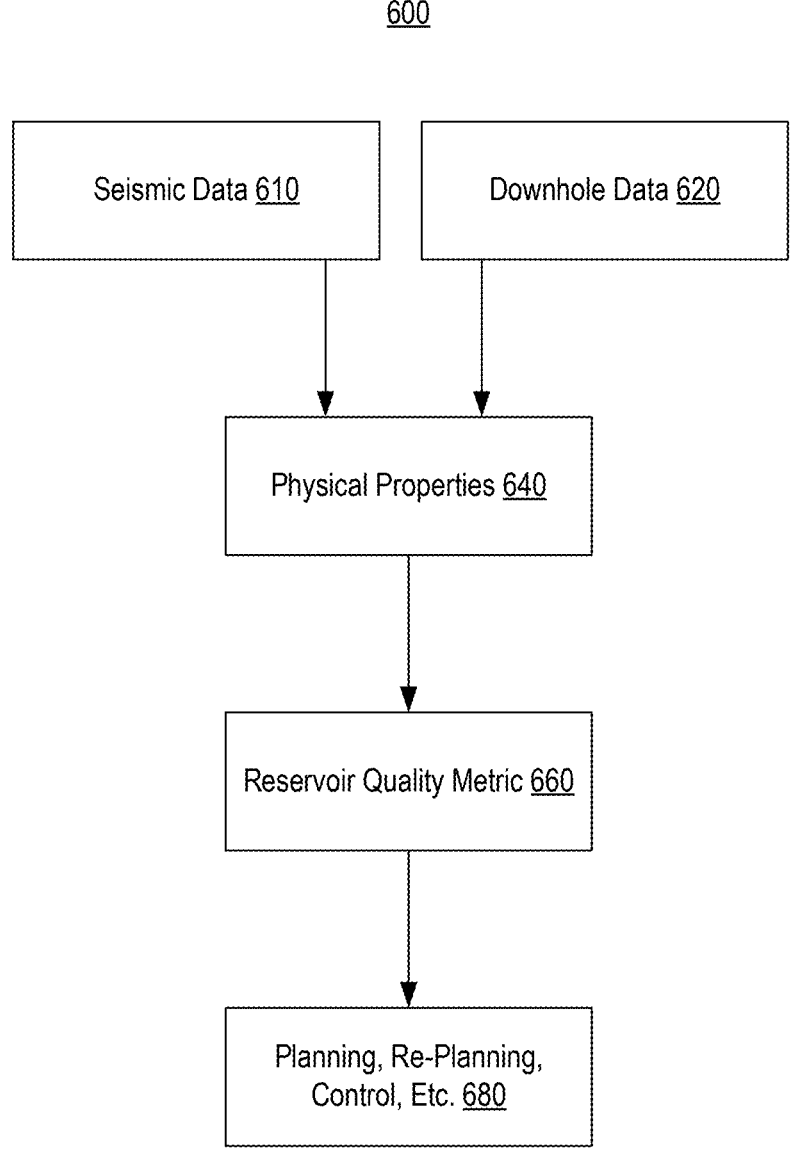
FIG. 6 illustrates an example of a workflow.

FIG. 6 shows an example of a workflow 600 that provides for combining seismic data (e.g., surface seismic data) 610 and downhole data 620 (e.g., data acquired from one or more downhole tools). In such an example, these data may be utilized to determine various physical properties 640. In turn, a reservoir quality metric 660 may be generated using one or more of the various physical properties 640. As shown, the workflow 600 may include performing one or more additional actions 680, such as, for example, consider planning, re-planning, control, etc.

As to acquisition of seismic data, consider a seismic survey that utilizes one or more sources and one or more receivers where a source emits energy that travels into a subsurface region and a receiver that receives a portion of that energy as reflected by one or more subsurface structures in the subsurface region.

As an example, a seismic survey may utilize seismic waves. For example, seismic waves may be defined as periodic vibrational disturbances in which energy is propagated through or on one or more surfaces of one or more media without translation of the material. As an example, seismic waves may be differentiated by their frequency, amplitude, wavelength and speed of propagation. For example, consider seismic waves as waves of elastic energy, such as, for example, elastic energy transmitted by P-waves and S-waves, which may generally be in a frequency range of approximately 1 Hz to approximately 100 Hz. Seismic energy may be processed to characterize a subsurface region, for example, as to composition, fluid content, extent and geometry of rocks. As to utilization of sonic sound waves, such as, for example, of a downhole sonic tool, frequencies may be in a generally higher range (e.g., consider frequencies from approximately 1 kHz to 25 kHz or more).

As to acoustic impedance (Z) as a physical property, it may be computed as the product of density and seismic velocity, which varies among different rock layers. The difference in acoustic impedance between rock layers affects the reflection coefficient. For example, just as an impedance mismatch affects reflection and transmission in electronics, an acoustic impedance mismatch affects reflection and transmission in subsurface environments.

As an example, types of petrophysical properties that may control the value of acoustic impedance in individual rock layers can include (i) elastic properties of a rock matrix and (ii) properties of fluid in pore spaces of rock. For example, P-waves may travel through elastic materials and fluids; thus, a change in either a rock matrix (e.g., consider a change in mineralogy or porosity) or in type of fluid occupying pore spaces may create a discontinuity in P-wave seismic impedance of a subsurface environment. Thus, acoustic impedance, as may be determined through utilization of seismic data, may provide indications as to rock matrix characteristics (e.g., mineralogy, porosity, etc.) and indications as to fluid characteristics in pore spaces of a rock matrix.

In the example of FIG. 6, the downhole data 620 may include LWD tool data that may be acquired and utilized in combination with the seismic data 610. As explained, an LWD tool may provide for acquisition of resistivity measurements of a subsurface region. For example, consider resistivity measurements that are acquired from an LWD tool located on a drillstring at a location uphole from a drill bit where such measurements may be transmitted uphole, optionally in real-time (e.g., via wire, mud-pulse telemetry, etc.). As explained, geosteering may utilize such measurements to control steering of a drill bit, particularly for a lateral (e.g., horizontal) portion of a borehole where an aim may be to keep the drill bit within a generally lateral reservoir layer.

As an example, before drilling a high-angle or horizontal borehole, potential hydrocarbon-bearing zones may be identified, for example, using one or more offset wells, using one or more vertical exploration wells, etc. In such an example, the high-angle or horizontal borehole may be drilled toward a target bed, for example, with marker beds used to maintain the borehole trajectory. In such an example, LWD resistivity logs acquired using an LWD tool located behind a drill bit may be compared to logs from one or more other wells (e.g., offset, exploration, etc.) to identify marker beds. As an example, computer modeling of predicted resistivity-tool response at different borehole deviation angles may be used to modify a borehole trajectory in real-time (e.g., to perform geosteering).

In various instances, an exploration well may be substantially vertical such that upon drilling of a horizontal portion of a borehole, a task involves comparing horizontal resistivity logs to vertical resistivity logs in a common zone. However, differences can exist due to anisotropy (e.g., variation of resistivity with respect to direction). In addition to particle-size anisotropy, formations that include a series of thin beds of different lithology (e.g., such as sequences of sand and shales) may also behave anisotropically if a logging tool is substantially longer than a bed thickness. In vertical wells, resistivity tools measure effective horizontal resistivity, Rh, which may be computed from a volume average of layer conductivities (e.g., inverse resistivities), where conductivities may be expressed in mS/m. As an example, Vsand and Vshale (or Vclay) may be bulk volume fractions (percentages) distributed throughout a layered region. As an example, effective vertical resistivity, Rv, may be computed in a similar manner from the volume average of the layer resistivities.

As to non-vertical boreholes (e.g., a deviated portion), apparent resistivity Ra in anisotropic media may be computed using an approximation that includes a value for an angle between a tool axis and a vertical direction. As to scenarios when the value for the angle is approximately 90 degrees, a non-vertical borehole may be considered to be substantially horizontal. As may be appreciated, vertical resistivity may be undetectable using various resistivity logging tools in a vertical portion of a borehole.

As explained, geosteering based on resistivity measurements from vertical exploration wells and real-time resistivity measurements from a horizontal portion of a borehole being drilled may present challenges, particularly where anisotropy exists.

Further, even where seismic data are utilized in combination with LWD data, challenges can exist. For example, properties, whether rock matrix or fluid, may be somewhat inaccurate at times such that decisions as to a borehole trajectory may be inherently uncertain (e.g., at a level that may impact drilling of a borehole). For example, actual porosity may be 10 percent, while estimated porosity may be 12 percent or 20 percent. As porosity may be an indicator of what is reservoir rock, an erroneous estimated porosity may result in planning a borehole trajectory or steering a drillstring drilling a borehole in a direction that may not necessarily be an optimal direction (e.g., a direction that acts to increase or optimize reservoir contact). As an example, the reservoir quality metric 660 may be generated in a manner that acts to reduce risks associated with reliance on individual physical properties, such as, for example, reliance on porosity values alone.

As an example, a framework may provide for utilization of deep directional electromagnetic (EM) measurements acquired while drilling, which may provide highly resolved, reservoir-scale, images with radial depths of investigation (DOI) in excess of 30 m, which may respond to the true 3D nature of the inhomogeneous electrical resistivity distribution around a borehole. As explained, a workflow, such as, for example, the workflow 600 of FIG. 6 may provide for implementing a while-drilling, real-time process that integrates deep EM resistivity data and available seismic data. In such an example, the seismic data may be provided as acoustic impedance, which may be interpreted jointly with deep EM resistivity data to provide added information specifically on reservoir petrophysical properties around a borehole being drilled and also in front of a drill bit utilized for drilling that lengthens the borehole.

As an example, a framework may provide for addressing one or more reservoir characterization objectives, for example, consider objectives to estimate petrophysical properties of prospective hydrocarbon traps and to reduce uncertainty of interpretation. In such an example, the framework may provide for implementing a workflow for petrophysical joint inversion of seismic and EM attributes to estimate a petrophysical model, for example, in terms of porosity and water saturation. As explained, a workflow may involve joint inversion within a probabilistic structure provided by a Bayesian approach. As an example, a framework may be applied to a real hydrocarbon exploration scenario to evaluate its contribution to an interpretation phase. As an example, 3D volumes of estimated porosity and saturation may be generated via joint inversion of acoustic impedance and electrical resistivity, which may provide a quantitative description of reservoir properties along with a measure of uncertainty, which may be consistent with a petrophysical model and observations. As explained, a reservoir quality metric may be generated using estimations of a number of physical properties. For example, consider a reservoir quality metric that may be generating using multidimension estimates of porosity and multidimensional estimates of saturation (e.g., water saturation, etc.). As explained, a reservoir quality metric may be a single metric that may be generated for a multidimensional region to thereby facilitate geosteering of a drillstring to form a borehole, lengthen a borehole, drill a branch of a borehole, etc.

As explained, an operator or company performing operations may want to perform reservoir characterization while drilling. Reservoir characterization while drilling may be considered a multiscale, multi-physics, subsurface integration problem. Workflows integrating seismic datasets together with logging while drilling (LWD) very deep directional resistivity measurements may help to enhance structural interpretation of a reservoir's strata, for example, as may be observed around a horizontal portion of a borehole being drilled as well as in front of a drill bit.

While deep directional electromagnetic (EM) measurements acquired while drilling may provide highly resolved, reservoir-scale, images with radial depths of investigation (DOI) in excess of 30 meters, resolving power of very deep directional resistivity tools ahead of a drill bit tends to be limited due to decreasing measurement sensitivity associated with the diffusive nature of EM fields induced in a formation. In various instances, inferring geo-electric structure ahead of a drill bit from EM LWD measurements alone can be rather challenging.

As explained, seismic data and downhole data may be combined, for example, to improve ahead of the bit predicting capabilities that enable integrated interpretation of the resistivity distribution obtained from deep directional EM measurements together with surface seismic data. In various instances, enhanced seismic data interpretation at reservoir-scale may yield a more focused description of structures expected around a borehole trajectory as well as ahead of a drill bit, albeit with lower resolution associated with processing a seismic dataset. In contrast, deep directional EM measurements can be used to determine the geo-electric structure, effectively around a borehole with sub-meter scale lateral sensitivity and thereby high resolution of resulting images when compared to surface seismic data.

As an example, integration of LWD measurements and surface seismic may provide for improving reservoir petrophysical property estimates, such as, for example, one or more of porosity, fluid saturation, volume of clay, etc. As explained, in a while-drilling, real-time process, integration of inversion for reservoir properties with seismic data may provide added information around a borehole being drilled and also in front of a drill bit. As an example, in a static setting, where data are already available, integration of reservoir properties may yield a global update of a 3D model incorporating datasets from multiple wells.

As an example, a workflow for integrating surface seismic and electromagnetic data may be utilized to obtain 3D volumes of reservoir property distributions, for example, via linking well log measurements, surface and seafloor marine remote sensing (e.g. controlled source electromagnetic), etc. As explained, a workflow may provide for integrating seismic data and LWD deep directional resistivity measurements where such seismic data may include one or more of surface seismic data and borehole seismic data.

As an example, in the workflow 600 of FIG. 6, a joint inversion of seismic data and LWD deep directional resistivity measurements may be performed for determining of one or more of the physical properties 640. For example, consider a joint inversion (e.g., simultaneous, etc.) that may be performed to characterize various reservoir physical properties (e.g., porosity, fluid saturation, etc.) in a while-drilling scenario. In such an approach, output may include enhanced characterization of a reservoir, around a borehole and in front of a drill bit.

Figure 7:
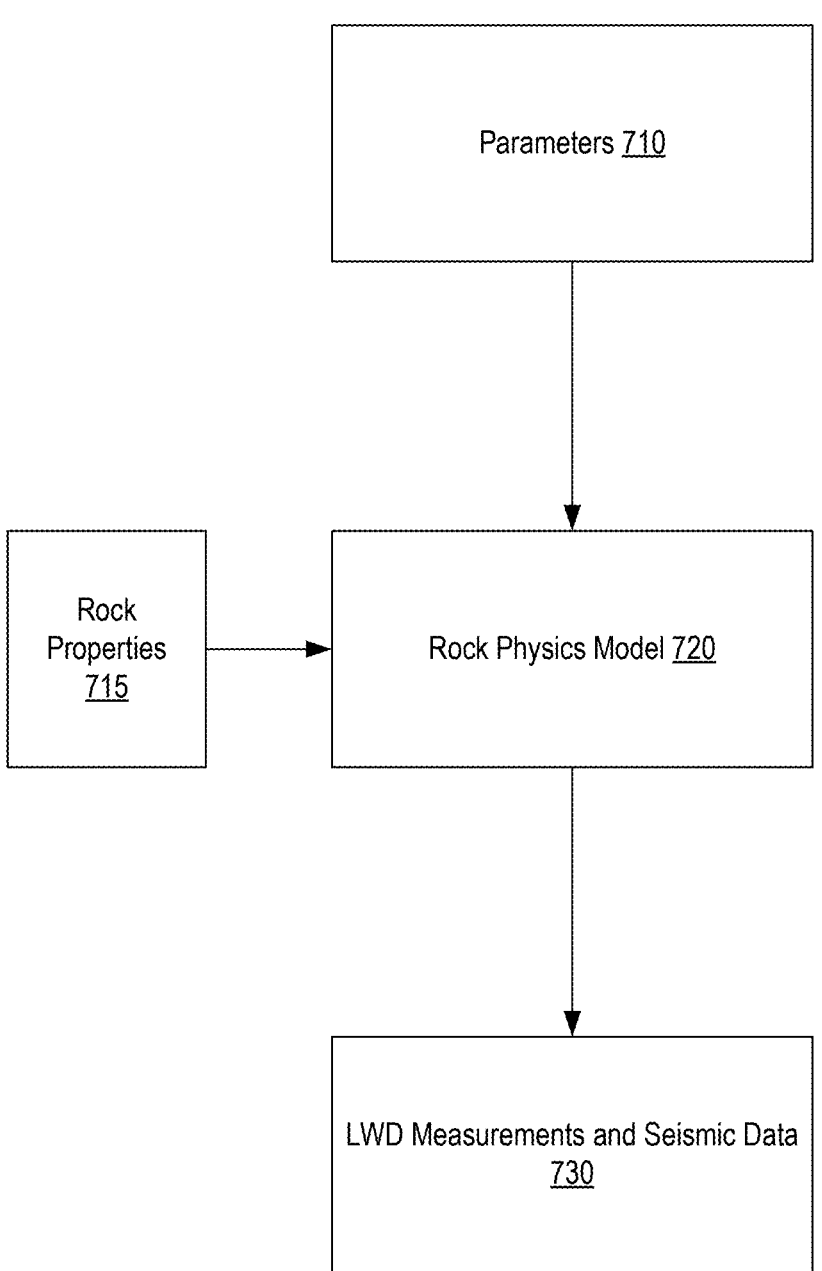
FIG. 7 illustrates an example of a workflow.

FIG. 7 shows an example of a workflow 700 that includes a parameters block 710, a rock properties block 715, a rock physics model block 720, and a LWD measurements and surface seismic data block 730. In the workflow 700, various relationships may be utilized, which may be empirical, physics-based, machine learning (ML) model-based, etc. For example, consider an approach that handles multidimensional data, such as, for example, three-dimensional data that may be organized as a cube (e.g., an array) where elements in the cube may be referred to as voxels. In such an example, a voxel may represent a volume of a subsurface region. For example, a voxel may be defined in part using physical dimensions of length, width, and height that correspond approximately to a physical volume of rock, which may be reservoir rock and/or another type of rock.

As an example, the workflow 700 may provide for performing a voxel inversion at a number of points in a 3D space. For example, consider defining an inversion as follows, where m is a vector:

$$m = \{\varphi, S_w, V_{CL}\}_i$$

where $\varphi$ is porosity, $S_w$ is water saturation, and $V_{CL}$ is volume of clay, i is the cell number, for example, a voxel or a pixel position in a section of the 3D space, where each cell (e.g., spatial location) may have an associated triplet as vector.

As an example, a modified Simandoux equation may be utilized, for example, that includes isotropic resistivity, where a saturation exponent n may be utilized (e.g., consider n not equal to 2 where solution may be via recursive numerical iterations, etc.). For example, consider the following example equations:

$$\frac{1}{R_t} = \frac{S_w^n \varphi^m}{R_w} + S_w \frac{V_{CL}}{R_{CL}}$$

$$R_t = f(m, \theta_R : m, n, R_w, R_{CL})$$

As an example, acoustic impedance, $I_p$, may be defined using a generalized Gassmann relationship, for example, as follows:

$$I_p = \sqrt{\rho\left(K_G + \frac{4}{3}\mu_m\right)}$$

$$K_G = g(m, \theta_G : K_w K_{HC}, K_s, A)$$

$$\rho = h(m, \theta_D : \rho_w, \rho_{HC}, \rho_s)$$

In the foregoing equations, $K_G$ is the bulk modulus of fluid saturated rock (e.g., consider $K_{sat}$ as an alternative notation), $\mu_m$ is the shear modulus, and $\theta_G$ refers to an array of parameters upon which $K_G$ may depend, which can include, for example, a Krief exponent (e.g., experimentally defined, etc.), which may be, for example, approximately 3 or another appropriate value, which may depend, for example, on one or more variables (e.g., consider vertical depth, etc.). An article by Krief et al., 1990, A petrophysical interpretation using the velocities of P and S waves (Full-waveform sonic), The Log Analyst, 31, 355-369, is incorporated by reference herein in its entirety. As to $K_s$, it refers to the bulk modulus of the solid phase only, which may be utilized to define a sand component; noting that a solid phase may be decomposed, for example, to incorporate dependence on multiple components, such as, for example, sand and clay (e.g., $K_D$, $\mu_D$, etc.) to determine moduli of a dry phase (e.g., where the subscript "D" refers to dry). As to the parameters, $K_w$ and $K_{HC}$, these represent the bulk moduli for water and hydrocarbon(s), respectively. Further, in the foregoing equations, $\theta_D$ represents an array of parameters that may be utilized in computing bulk density (e.g., where the subscript "D" refers to density), which may include $\rho_w$, $\rho_{HC}$, and $\rho_s$, as water density, hydrocarbon density, and solid phase density, respectively. As an example, the solid phase density, $\rho_s$, it may be described as a function of volume fractions occupied by a number of constituents, for example, a number of minerals each with an associated volume fraction. As an example, an inversion may be performed in a manner using input parameters that may be specified using known values, values obtained from a priori knowledge of a reservoir being drilled, etc. For example, the arrays $\theta_G$ and $\theta_D$ may be composed of such input parameters where the values thereof may remain fixed during an inversion.

As an example, the parameters of the parameters block 710 may be represented as $\theta$; the rock properties of the rock properties block 715 may be represented as $m=\{m_i\}$; the rock physics model of the rock physics model block 720 may be represented as $g(m; \theta)$; and the LWD measurements and the surface seismic data of the block 730 may be represented as follows:

$$d = \{d_i\}$$

$$d_i = g(m_i; \theta) + \varepsilon_i$$

As indicated in FIG. 7, the workflow 700 may provide for determining reservoir properties (e.g., porosity, water saturation and volume of clay) through a joint inversion of measurements, which include resistivity (e.g., isotropic resistivity) ($R_t$) and acoustic impedance ($I_p$). These measurements may be related to reservoir properties through a modified Simandoux relationship and through generalized Gassmann equations. As shown, such equations may have their own set of model parameters, which may be adjusted from one or more other types of available data, which may be obtained, for example, through petrophysical analysis of well logs, etc.

As an example, the workflow 700 may be adjusted to obtain reservoir properties through a joint inversion of anisotropic resistivity (e.g., $R_h$ and $R_v$) and acoustic impedance, for example, as related to reservoir properties through a generalized anisotropic rock physics model and generalized Gassmann equations. For example, consider the following relationship being utilized for an anisotropic resistivity rock physics model:

$$R_h, R_v = f(\varphi, S_w V_{CL} \ldots)$$

Disclosed herein are example workflows for joint inversion of very deep directional resistivity logging while drilling measurements. In certain embodiments, a joint inversion can include use of a surface seismic dataset around a wellbore and ahead of a drilling bit, in real-time while drilling the wellbore (e.g., breaking rock to lengthen the wellbore).

As an example, an approach may involve obtaining a surface seismic dataset and using the surface seismic data set to provide a 3D volume of acoustic impedance around a planned or currently being drilled borehole. In certain embodiments, this may be performed prior to performing one or more drilling operations. As an example, a 3D acoustic impedance volume may be calibrated according to one or more structural components in a subsurface region as may be updated in accordance with a calibration procedure. As an example, an acoustic impedance volume and a distribution of resistivity around a borehole may then be processed jointly to yield reservoir properties using one or more joint inversion techniques. In one embodiment, reservoir properties may be mapped in a 3D volume around at least a portion of a borehole.

In one embodiment, the 3D resistivity volume may be extrapolated to estimate expected resistivity distribution in front of a drill bit (e.g., beyond an end of a borehole). In such an example, extrapolation may be performed using one or more of multivariate stochastic modeling, inversion of LWD raw EM measurements, or one or more other techniques to yield information in front of a source exciting an EM field as part of a downhole tool. As an example, once an extrapolation is complete, a joint inversion process may be applied between acoustic impedance and resistivity volumes, for example, including an extension or extensions of measurements to positions beyond a drill bit (e.g., end of a borehole).

As an example, a multivariate stochastic model may be used to capture uncertainty of reservoir property estimation. As an example, a workflow may be implemented to enhance a joint inversion of deep directional resistivity logging while drilling measurements and surface seismic datasets using anisotropic resistivity data.

In various instances, one or more techniques for estimation of reservoir properties may yield a potentially biased estimation of reservoir properties due to the nature of an inherently undetermined problem. As an example, an inversion problem may be formulated and computationally involve solving for porosity, water saturation and volume of clay, for example, from two available data points, such as a datum point for acoustic impedance and a datum point for resistivity. In certain embodiments, such an approach may perform such computations at various points in space, for example, depending on data availability, data quality, data interpolation, etc.

As an example, a joint inversion may provide for addressing scenarios where a lack of data points exist, for example, by using an anisotropic response of electromagnetic measurements obtained using deep directional EM LWD tools (e.g., consider use of the GEOSPHERE tool (SLB, Houston, Texas). As an example, given a relationship between vertical and horizontal resistivities and reservoir properties, as explained, a workflow may provide for setting up a problem to solve for porosity, water saturation and volume of clay using acoustic impedance, resistivity horizontal (Rh) and resistivity vertical (Rv).

As an example, a functional relationship between Rh and Rv with respect to porosity, saturation, volume of clay, and one or more other properties may be directed from one or more empirical relationships, one or more physical relationships, one or more machine learning models, etc. As an example, a functional relationship may be derived using one or more effective medium theory approaches.

As an example, a framework may provide for estimating secondary porosity, for example, through joint inversion of seismic data and deep directional resistivity anisotropic measurements. As an example, one or more fluid-filled fractured zones may potentially yield preferential flow paths for electrical currents excited in deep directional EM LWD measurements. In such an example, anisotropic response may be related to fracture orientation together with fluid saturation, porosity, and/or one or more other characteristics. As an example, one or more joint inversion techniques may be modified, adjusted, etc., for example, to incorporate one or more functional relationships between fracture orientation and resistivity anisotropy together with porosity, fluid saturation, and one or more other properties.

As an example, one or more approaches may be used in connection with saturation mapping of fluids in subsurface geologic strata, for example, through knowledge of water salinity and temperature, hydraulic boundaries mapping in subsurface strata, imaging and detection of trapped fluids in geologic formations, etc.

As an example, one or more reservoir characterization objectives may aim to estimate one or more petrophysical properties of one or more prospective hydrocarbon traps and, for example, aim to reduce uncertainty of an interpretation. As explained, a computational framework may provide for implementing one or more workflows that may involve petrophysical joint inversion of seismic and EM attributes to estimate a petrophysical model, for example, in terms of porosity and water saturation as physical properties that characterize a subsurface environment. Such an approach may realize a joint inversion within a probabilistic structure, for example, as may be provided via a Bayesian approach. As an example, a framework may be utilized to implement a workflow applied to a real hydrocarbon exploration scenario to evaluate its contribution to an interpretation phase. As an example, one or more 3D volumes of estimated porosity and saturation may demonstrate how a joint inversion of acoustic impedance and electrical resistivity can provide a quantitative description of reservoir properties and, for example, with it, a measure of uncertainty, which may be consistent with a petrophysical model and observations.

As explained, a rock petrophysics link may be defined via one or more approaches, which may include, for example, one or more of analytic functionals, empirically derived relationships, geostatistical expressions, machine learning models, etc. As explained, a link may aim to relate resistivity and seismic acoustic impedance with various petrophysical reservoir properties (e.g., porosity, water saturation, etc.).

In various instances, a link or links may result in some bias such that determination of individual petrophysical properties are not necessarily accurate. As an example, in various instances, where absolute magnitudes of resulting petrophysical properties are biased by inaccuracies of a link or links, their relative variability within a reservoir may be preserved. For example, estimated porosity may be biased with respect to true porosity, however, relative spatial variations (e.g., increasing and/or decreasing porosity, etc.) within a formation may remain representative of actual spatial variations in the formation. While porosity is mentioned, the concepts of such spatial variations, etc., may be relevant to one or more other physical properties (e.g., consider water saturation, volume of clay, etc.).

As explained with respect to the example workflow 600 of FIG. 6, a workflow may provide for estimating and visualizing a reservoir quality metric (e.g., a reservoir quality indicator, denoted RQ). As explained, such a metric may be generated by combining a number of physical properties derived via one or more inversion techniques, such as, for example, one or more of the techniques described with respect to the example workflow 700 of FIG. 7. As an example, a workflow may provide for generation of a single indicator of "goodness" of a reservoir. In various instances, goodness of a reservoir may or may not be related to productivity, which may be represented by a productivity index. In various instances, goodness or reservoir quality (RQ) may be informative for planning, re-planning, control, etc., without express concern for productivity or, for example, one or more workflows may involve utilizing RQ in combination with a separate metric for productivity (e.g., a productivity index). For example, consider a drilling control workflow where direction of a drillstring is controlled using RQ and optionally a productivity index (PI) where the PI may be utilized in a guardrails approach to reduce detriments of drilling toward higher RQ values if PI values may indicate that productivity may be compromised.

An article by Zhang et al., entitled "Method and Utility of Well Productivity Estimation during Drilling", presented at the International Oil and Gas Conference and Exhibition in China, Beijing, China, June 2010 (doi: https://doi.org/10.2118/130811-MS) is incorporated by reference herein in its entirety. The article by Zhang et al. describes techniques for productivity estimation during drilling, one or more of which may be utilized to generate a productivity index (PI).

As explained, a method may provide for combining estimated reservoir properties (e.g., porosity, water saturation, etc.) into a single indicator. For example, consider a RQ metric as a single indicator.

As an example, a reservoir quality indicator may be utilized in planning, re-planning, geosteering to geosteer a drillstring, etc., where the reservoir quality indicator may take into consideration where in space is a reservoir to be of a better quality.

As an example, a reservoir quality indicator may be determined while drilling in real time. For example, consider a system that includes an instrumented drillstring and surface equipment where surface seismic data are available for a subsurface region where a borehole is to be drilled or is being drilled. In such an example, data acquired by the instrumented drillstring may be transmitted to the surface equipment using one or more techniques, technologies, etc., where, once at surface, one or more inversions may be performed to generate multidimensional reservoir quality indicator values in real-time. In such an example, these values may be utilized by a human, a machine, a human and a machine, etc., to control one or more pieces of equipment involved in drilling of the borehole. For example, consider instructing an autodriller to control one or more of a drawworks, a top drive, a hydraulics system, an RSS, a drilling mode (e.g., slide drilling, rotary drilling, etc.), such that drilling of the borehole occurs in a manner guided by the reservoir quality indicator where the actual direction of a drillstring is directed toward a constant reservoir quality or a higher reservoir quality.

As an example, a number of reservoir quality indicators may be determined pre-drilling. For example, consider an approach where indicators are determined for a borehole trajectory where the borehole trajectory may be planned in a manner that accounts for reservoir quality. For example, consider a borehole trajectory optimization framework that may utilize reservoir quality as a factor, for example, in a multi-factor optimization. In such an example, reservoir quality values may be associated with positions along a borehole trajectory that may be utilized in one or more control techniques during actual drilling where, for example, real-time reservoir quality values may be compared to pre-drilling reservoir quality values. In such an example, where a deviation occurs, a framework may call for generation of a multidimensional map of reservoir quality values such that drilling may be controlled in a manner whereby reservoir quality may be improved. Such an approach may be a triggered approach or on-demand approach that is implemented responsive to a deviation, which may be specified with respect to one or more limits, which may, for example, differ depending on one or more aspects of drilling, which may include, for example, borehole length (e.g., measured depth), true vertical depth, etc.

As explained, a framework may provide for computing reservoir quality values pre-drilling, during a feasibility stage, during drilling, post-drilling, after new geosteering data have been acquired, etc. In such examples, a framework may provide for using available deep resistivity, and other (e.g. seismic data, seismic derived structural information, well logs, etc.), to build one or more models of reservoir quality. In such an example, the one or more models may be utilized to plan one or more future wells.

As an example, a framework may provide for reservoir quality to be estimated, displayed, and analyzed around a portion of a borehole being drilled and also predicted ahead of a drill bit.

As an example, a reservoir quality indicator may be utilized for automating geosteering decisions, which can include prioritizing and/or optimizing planned trajectory options. As explained, a real-time approach, geosteering may be automated in a manner that accounts for generated reservoir quality values, which may be bounded using one or more guardrails (e.g., productivity, ROP, energy expended, emissions, completions concerns, etc.).

As an example, a reservoir quality indicator may be used for estimating and providing real-time and/or post-drill environmental related metrics or savings. For example, consider an overarching approach that accounts for reservoir quality as to reservoir contact of a drilled borehole and emissions expended to drill that borehole. In such an example, one or more decisions may be made in real-time during drilling to provide for an adequate reservoir quality with adequate emissions (e.g., a desirable level of emissions).

As an example, a reservoir quality indicator may be computed using estimated reservoir properties. For example, consider a framework that may utilized one or more predefined analytic functionals. For example, consider a function, f, defined as follows: RQ=f(porosity, water/oil saturation, volume of clay, lithology).

As an example, consider a framework that may generate a reservoir quality using the following equation:

$$RQ = \text{Porosity}/(\text{Water Saturation} * \text{Volume of Clay})$$

As an example, a framework may utilize one or more empirically determined functionals such that RQ=f(porosity, water/oil saturation, volume of clay, lithology).

As an example, one or more empirical, machine learning model, etc., relationships may be defined as being specific to a given reservoir. In such an example, such relationships may be determined, for example, using available well log information in an area of interest.

As an example, uncertainty of reservoir quality may be determined approximately by the following example equation:

$$\Delta RQ = \sqrt{\left|\frac{\partial RQ}{\partial Por}\Delta Por\right|^2 + \left|\frac{\partial RQ}{\partial Sat}\Delta Sat\right|^2 + \left|\frac{\partial RQ}{\partial Vshale}\Delta Vclay\right|^2}$$

In the foregoing example equation, such an approach can involve propagating the error of the estimated porosity ($\Delta Por$), saturation ($\Delta Sat$), and volume of clay ($\Delta Vclay$), given the sensitivity of RQ to each of the parameters, for example, as may be expressed by partial derivatives $\partial RQ/\partial$ . . . , etc.

As an example, one or more relationships may be determined by finding a suitable link of deep resistivity data and seismic data available in an area of interest.

As an example, a framework may provide for generation and/or use of one or more statistical functionals linking the geostatistical distribution of reservoir properties. In such an example, one or more statistical distributions may be determined using data that become available in real-time while drilling. As an example, one or more statistical distributions may be determined by data that are available pre-drilling, for example, from one or more reference well logs and seismic data. As an example, a framework may utilize data from one or more data stores and data acquired in real-time during drilling operations.

As an example, a framework may provide for generation and/or utilization of one or more look up tables (LUTs). For example, one or more tables of RQ may be generated in advance of drilling from available data in an area of interest and in turn a representative estimate may be looked up and post processed (e.g. averaged) from available values in one or more LUTs.

As an example, one or more machine learning techniques, technologies, etc., may be implemented. For example, consider utilization of an ML model trained to understand the relationship between quality of a reservoir and corresponding porosity, water saturation, etc. In such an example, multiple examples of training data may be generated from available data collected in previous drilling operations, generated synthetically from available reservoir flow models, generated from estimates of reservoir properties obtained while drilling, etc. For example, consider utilization of estimates of reservoir properties along a borehole or from deep resistivity, and one or more corresponding measures of RQ interpreted by one or more experts that may analyze data. As an example, at the outset a trained ML model may be presented with new data (e.g., seismic, resistivity, porosity, saturation, etc.) to provide for outputting RQ determinations.

As an example, a reservoir quality indicator may incorporate the impact of fracture density. For example, consider a framework where a link of fracture density and one or more other reservoir properties may be assumed to follow a functional relationship, which may be defined using one or more techniques, technologies, etc. (e.g., empirically, physics model-based, hybrid, machine learning, etc.).

As an example, a framework may provide for generating and interacting with one or more graphical user interfaces (GUIs) where visualizations may be rendered that may include various graphical controls. As an example, a dashboard may be rendered that may allow an individual to visualize comprehensive results within a GUI, which may facilitate further interpretation, quality control, etc.

FIG. 8 shows an example of a system 800 that includes an input 810, integrated predictive geosteering (IPG) framework components 850, and output 880 and an example of a method 801 that includes reception blocks 802 and 803, a generation block 804, a technique(s) block 805, a generation block 806, and an implementation block 808.

As an example, a resistivity distribution may be from ultra deep azimuthal resistivity, interpreted resistivity models, PERISCOPE tool (SLB, Houston, Texas), etc. As an example, seismic data may include raw data, derived products, etc. As an example, seismic data may include interpreted geometrical objects (surfaces, faults, geobodies), surfaces, spatial distribution of acoustic impedance, signal processing products (e.g., wavelet extraction, filtering, etc.), etc. As an example, input may include integration control parameters, which may include, for example, parameters to determine one or more aspects pertaining to the IPG framework components 850. For example, consider expected correlation lengths, uncertainties of input data and/or derived products (e.g., uncertainty of interpreted surfaces, uncertainty of well trajectory, uncertainty of resistivity distribution, etc.).

As an example, a geometrical update may refer to updating spatial positions of seismic data and/or derived products. As an example, the system 800 may provide for extrapolating data and/or derived products that are available generally behind a bit (e.g., resistivity, reservoir properties such as porosity, water saturation, volume of clay, etc.) to positions ahead of the bit and/or around a borehole.

As an example, the system 800 may provide for estimating uncertainty in a resulting geometry update and/or forward prediction. For example, consider determination of confidence limits of an interpreted surface extrapolated to positions away from a drill bit, uncertainty of resistivity that has been predicted in front of a drill bit, uncertainty of reservoir properties (e.g., porosity, saturation, etc.), etc.

As an example, the system 800 may provide for repositioning of seismic data and/or derived products (e.g., surfaces, faults, acoustic impedance data, etc.).

As an example, the system 800 may provide for generation of a newly created distribution of reservoir properties (e.g., resistivity, porosity, water saturation, clay content, lithology, etc.), which may be, for example, extrapolated to positions in front of a drill bit (e.g., beyond an end of a borehole).

As an example, the system 800 may provide for generation of newly created geometrical objects, such as, for example, one or more of surfaces, fault planes, geobodies, which may be used to quantify and/or display for analysis uncertainty of a prediction and/or updated position of seismic data and/or derived products. As an example, a workflow may be automated using an inversion, such as, for example, an acoustic impedance and resistivity inversion, which may be performed during a drilling operation. As to examples of objects, in various instances fluid contact may be of interest (e.g., consider a water zone). In various instances, fluid contact may be identified via an inversion (e.g., resistivity inversion) where such an object may be used to improve a workflow, for example, as water may have a relatively strong signal response in resistivity when compared to acoustic impedance. As an example, a joint inversion may proceed in a simultaneous manner and/or a sequential manner.

As an example, the system 800 may provide for generation of newly created reservoir properties distributions, which may be utilized for one or more purposes (e.g., quantify uncertainty of a reservoir property distribution, etc.).

As shown, the method 801 may include the reception block 802 and 803 for receiving seismic data and resistivity data, respectively, which may be in one or more forms (e.g., real, modeled, synthetic, etc.) that are based at least in part on some amount of knowledge of a subsurface region that includes a borehole to be lengthened through drilling. As shown, the generation block 804 may generate synthetic seismic data utilizing the one or more techniques 805. As explained, one technique may involve generating reflectivity data from resistivity data. As shown, the generation block 806 may provide for generating a displacement field. For example, consider comparing or otherwise assessing received seismic to synthetic seismic. As explained, one approach may involve comparing reflectivity data to reflectivity data derived from resistivity. As an example, an assessment may involve applying subtraction, matching, fitting, etc. As shown, the method 801 may include an implementation block 808 for implementing the displacement field. For example, consider implementing the displacement field in geosteering to steer a drill bit in a borehole to lengthen the borehole.

As an example, the method 801 may be a real-time or online method whereby the method 801 is executed responsive to receipt of the resistivity data. For example, consider a directional drilling operation where a tool of a drillstring acquires resistivity data that may be transmitted to one or more framework components to generate synthetic seismic data. In such an example, a displacement field may be generated, for example, using already received seismic data, etc., which, in turn, may be utilized to control the drillstring in a manner that causes a drill bit to move in a particular direction in view of locations of subsurface structures positioned at least in part via the displacement field. In such an example, the method 801 and/or parts thereof may be performed in a loop (e.g., a feedback loop, etc.). As an example, the method 801 may be part of a control method for controlling one or more aspects of directional drilling.

As to synthetic seismic data, a method may include generating multidimensional synthetic seismic data (e.g., 2D and/or 3D), in the vicinity of a borehole. In such an approach, properties may be correlated to LWD measurements of higher resolution than standard seismic data. As an example, synthetic seismic data may be generated according to one or more factors, which may facilitate leveraging such data in combination with log data (e.g., LWD measurements, etc.). For example, consider generating synthetic seismic data with particular properties, vertical and lateral resolution(s), structural complexity, etc. In such an example, one or more factors may tailor synthetic data for a particular geosteering application. As an example, a method may involve generating suitable synthetic seismic data directly or indirectly. For example, a direct approach may consider factors as part of a simulation process; whereas, an indirect approach may utilize a more generic simulation process and then transform results thereof in consideration of one or more factors. As explained, synthetic seismic data may be generated for a particular purpose, which can be for computation of a reservoir quality metric. As an example, a definition of a reservoir quality metric may provide for defining one or more factors to be taken into account when generating synthetic seismic data. For example, as explained, resolution may be a factor.

As explained, improved geosteering may improve borehole characteristics such that completions and production may be improved, for example, by reducing the number of wells to be placed, by creating better wells with greater certainty, by meeting production targets, by reducing $CO_2$ emissions, etc. For example, by achieving a production target for a field or an area thereof with fewer wells, energy may be conserved and, correspondingly, emissions of one or more greenhouse gases (GHGs) such as $CO_2$.

As an example, a framework may provide for improved understanding of a subsurface environment at a borehole, particularly where such subsurface environment may be complex, heterogenous, etc. As an example, a framework may provide for delineation of structural features and/or fluid.

Figure 9:
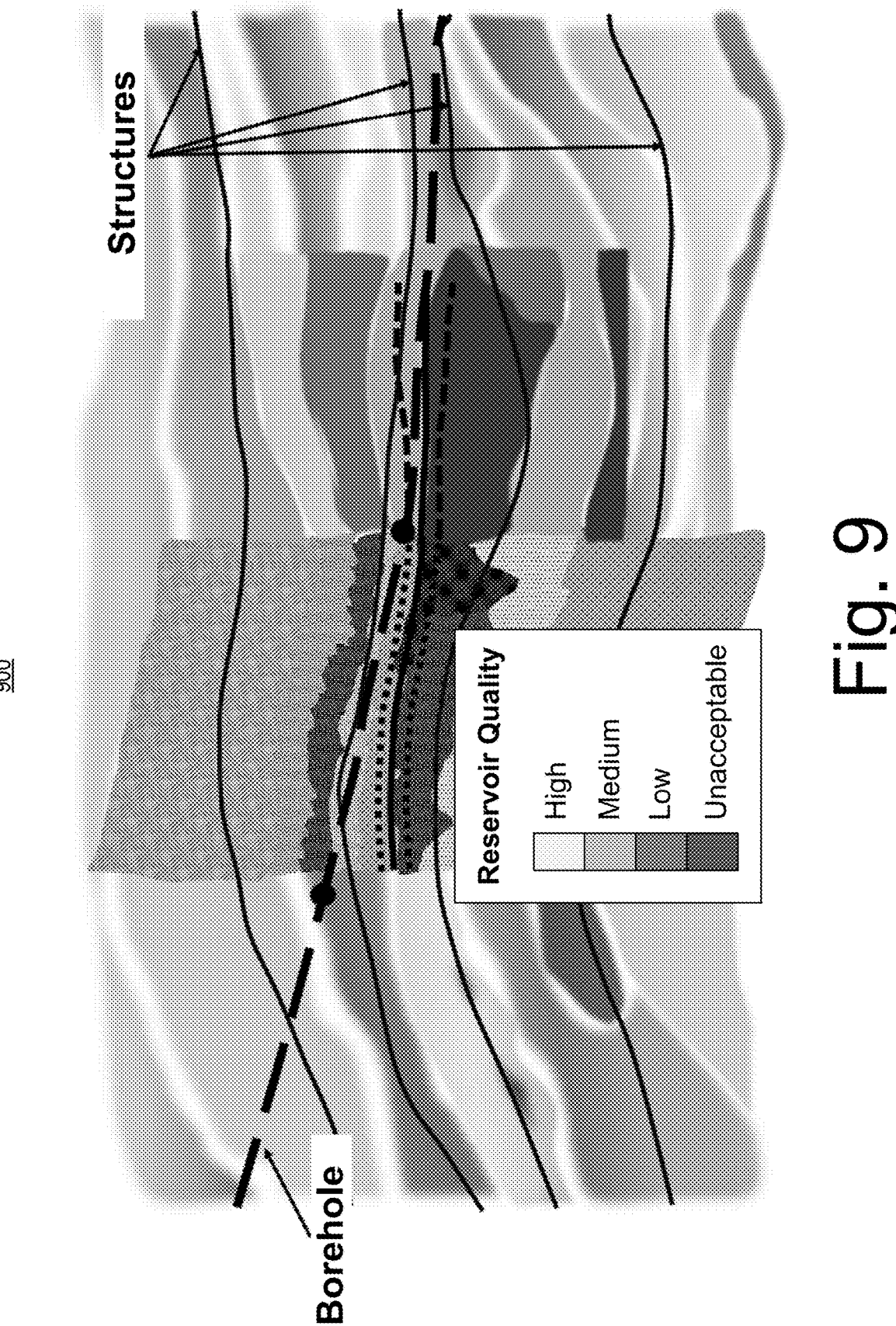
FIG. 9 illustrates an example of a graphical user interface.

FIG. 9 shows an example of a GUI 900 that includes various outputs in an integrated visualization. In particular, in the example GUI 900, the visualization integrates surfaces and values for reservoir quality, which, as explained, may be a single value metric that may be presented spatially with respect to a borehole. For example, consider a grayscale, color, or other representation that may be rendered to facilitate control, decision-making, etc. As an example, the reservoir quality values in the example GUI 900 may be generated using a workflow, such as, for example, the workflow 600 of FIG. 6.

As an example, advanced settings may be utilized for one or more types of tasks, workflows, etc. For example, consider research tasks or workflows, well placement tasks or workflows, etc. As an example, advanced settings of each sub-workflow may provide for more detailed investigation of each run, for example, based on given information provided by within a master, integrated workflow. As an example, an integrated workflow may automatically re-run one or more corresponding sub-workflows according to inputs and/or one or more settings changes. As an example, session objects may provide an opportunity for a user to compare results from different settings.

As an example, inputs and/or outputs may be utilized to generate a visualization in a curtain section view of reservoir quality. For example, consider a PETREL framework curtain section view. As explained, a framework may provide for generation of reservoir quality values and productivity values. As an example, a framework may provide for rendering of such values, in combination or separately.

As an example, an integrated workflow may be suitable for receipt of various types of resistivity data, which may be available via one or more downhole tools and/or one or more applications that may process such data. As an example, consider resistivity data and/or results that may be from a tool and/or a service that may provide for 1D inversion, 2D longitudinal inversion, 2D transverse inversion, 3D volumes, etc. As mentioned, an application such as an ultra-deep azimuthal resistivity framework may be utilized, which may be considered to be a service.

As an example, a framework may provide for generation of results according to one or more metrics. For example, consider a reservoir property metric, a reservoir character metric, a reservoir quality index, etc. As an example, a framework may provide for prediction of one or more metrics in a region proximate to a borehole being drilled such that geosteering may be controlled based at least in part on one or more of such metrics. As an example, a metric may be a fluid associated metric, a matrix associated metric, etc. As an example, one or more metrics may be combined with one or more structural features such as, for example, a layer boundary. For example, consider a visualization where one or more values for one or more metrics may be rendered for a material on one side of a boundary and/or for a material on another side of a boundary. In such an example, geosteering may be controlled on the basis of a boundary (e.g., geometrically) where knowledge of material characteristics (e.g., fluid, matrix, etc.) may be taken into account. In such an example, consider steering closer to a boundary where material on the other side of the boundary does not pose a substantial risk to a borehole being drilled; whereas, if the material on the other side of the boundary does pose a substantial risk, then a drill bit may be steered to drill a borehole that maintains a suitable distance from the boundary. As to a risk, consider a risk of borehole integrity (e.g., a material that may compromise borehole strength), consider a risk of borehole fluid influx (e.g., a material that may have a considerable amount of water), etc.

As an example, a framework may provide for implementation of an automated mode where, for example, the framework responds to receipt of real-time data (e.g., as transmitted using mud-pulse telemetry, wired pipe, etc.). In such an example, the framework may provide for generation of output that may be readily consumed for purposes of improved geosteering, etc. (e.g., consider QC output, metric output, structural feature output, etc.).

As an example, a framework may be utilized in combination with one or more other frameworks. For example, consider utilization of the PETREL framework, which may provide for data access for pre-job modeling. As an example, during drilling, a framework may be implemented in combination with the DRILLOPS framework.

As an example, a framework may implement a machine learning model trained using data from a number of offset wells where the machine learning model may be trained and implemented without testing of the machine learning model.

As an example, a tool string may include an embedded framework that may provide for downhole automated control of one or more operations of the tool string, which may include, for example, geosteering. As an example, a rig control system (RCS) may include an embedded framework that may provide for control of one or more operations, which may include, for example, geosteering. In such an example, one or more levels of automation may be implemented such that the framework forms part of a control loop, which may be a closed control loop and/or a human-in-the-loop (HITL) type of control loop. As an example, a cloud platform may be utilized for one or more purposes. As an example, where a model is to be updated, an updated model may be provided via one or more environments for implementation in the field, for example, at a rig site environment and/or in a tool string environment.

As an example, one or more components of a framework may utilize one or more machine learning models. For example, consider a machine learning model that may be utilized to assess, compare, match, etc., one or more datasets, types of data, etc. As an example, an image-based approach may be utilized, which may provide for single or multidimensional reservoir quality generation and/or application.

As explained, knowledge of what lies ahead can be beneficial in drilling, particularly where the knowledge of what lies ahead extends a sufficient distance (in one or more dimensions) to meaningfully allow for practical decisions in drilling. As an example, a framework may provide for real-time and/or near real-time output that is actionable given constraints in drilling, which may include ROP, borehole quality, length of stands, number of drillpipes per stand, etc. As an example, a framework may provide for at least a stand ahead improved view of a subsurface region with respect to at least reservoir quality. As an example, consider a two to three stands ahead improved view of a subsurface region, where, for example, the view may be accompanied by uncertainty, which may facilitate decision-making, control, etc., of drilling.

As to types of machine learning models, consider one or more of a support vector machine (SVM) model, a k-nearest neighbors (KNN) model, an ensemble classifier model, a neural network (NN) model, etc. As an example, a machine learning model may be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model (ML model), may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open-source software library for dataflow programming that includes a symbolic math library, which may be implemented for machine learning applications that may include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method may include various actions that may operate on a dataset to train an ML model. As an example, a dataset may be split into training data and test data where test data may provide for evaluation. A method may include cross-validation of parameters and best parameters, which may be provided for model training.

The TENSORFLOW framework may run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system-based platforms.

TENSORFLOW computations may be expressed as stateful dataflow graphs; noting that the name TENSORFLOW derives from the operations that such neural networks perform on multidimensional data arrays. Such arrays may be referred to as "tensors".

As an example, a device may utilize TENSORFLOW LITE (TFL) or another type of lightweight framework. For example, consider a gateway that may be in the field (e.g., on-site) and that may utilize the TFL and/or one or more other types of lightweight frameworks. The TFL framework is a set of tools that enables on-device machine learning where models may run on mobile, embedded, and IoT devices. The TFL framework is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). The TFL framework offers multiple platform support, covering ANDROID and iOS devices, embedded LINUX, and microcontrollers. The TFL framework offers diverse language support which includes JAVA, SWIFT, Objective-C, C++, and PYTHON. The TFL framework may provide high performance via hardware acceleration and model optimization.

FIG. 10 shows an example of a method 1000 that includes a reception block 1010 for receiving resistivity data acquired by a downhole tool of a drillstring disposed at least in part in a borehole in a subsurface environment, where the borehole includes a downhole end, and where the borehole defines a borehole axis; a reception block 1020 for receiving seismic data for the subsurface environment, where the seismic data include spatial locations; an inversion block 1030 for inverting at least a portion of the resistivity data and at least a portion of the seismic data to estimate values for a number of physical properties of a portion of the subsurface environment; and a generation block 1040 for generating reservoir quality metric values using the values for the number of physical properties. As shown, the method 1000 may also include a control block 1050 for controlling the drillstring using the reservoir quality metric values. For example, consider controlling the drillstring to drill further into the subsurface environment to lengthen the borehole.

The method 1000 of FIG. 10 is shown as including various computer-readable storage medium (CRM) blocks 1011, 1021, 1031, 1041, and 1051 that may include processor-executable instructions that may instruct a computing system, which may be a control system, to perform one or more of the actions described with respect to the method 1000.

As shown in the example of FIG. 10, the system 1090 may include one or more computers 1092 that include one or more processors 1093, memory 1094 operatively coupled to at least one of the one or more processors 1093, instructions 1096 that may be, for example, stored in the memory 1094, and one or more interfaces 1095 (e.g., one or more network interfaces and/or other interfaces). As an example, the system 1090 may include one or more processor-readable media that include processor-executable instructions executable by at least one of the one or more processors 1093 to cause the system 1090 to perform actions such as, for example, one or more actions of the method 1000. As an example, the instructions 1096 may include instructions of one or more of the CRM blocks 1011, 1021, 1031, 1041, and 1051. The memory 1094 may be or include the one or more processor-readable media where the processor-executable instructions may be or include instructions. As an example, a processor-readable medium may be a computer-readable storage medium that is non-transitory that is not a signal and that is not a carrier wave.

As an example, the system 1090 may include subsystems 1091. For example, the system 1090 may include a plurality of subsystems 1091 that may operate using equipment that is distributed where a subsystem 1901 may be referred to as being a system. For example, consider a downhole tool system and a surface system. As an example, operations of the blocks 1010, 1020, 1030, and 1040 of the method 1000 may be performed using a downhole tool system. As an example, operations of the block 1050 of the method 1000 may be performed using a downhole tool system (e.g., consider in integrated controller in a drillstring). The method 1000 may be implemented using, for example, a downhole system and/or a surface system, which may be a cloud-based or cloud-coupled system.

As an example, a method can include receiving resistivity data acquired by a downhole tool of a drillstring disposed at least in part in a borehole in a subsurface environment, where the borehole includes a downhole end, and where the borehole defines a borehole axis; receiving seismic data for the subsurface environment, where the seismic data include spatial locations; inverting at least a portion of the resistivity data and at least a portion of the seismic data to estimate values for a number of physical properties of a portion of the subsurface environment; generating reservoir quality metric values using the values for the number of physical properties; and controlling the drillstring using the reservoir quality metric values. In such an example, the seismic data can include surface seismic data of the subsurface environment and/or downhole seismic data of the subsurface environment (e.g., consider sonic data, cross-well data, etc.). As an example, a method may utilize synthetic seismic data representative of a subsurface environment, additionally or alternatively. As an example, seismic data may be acquired, generated and/or tailored according to one or more factors for purposes of generation of reservoir quality metric values.

As an example, a number of physical properties may include one or more of porosity, water saturation, and volume of clay. As an example, volume of clay may be or include volume of shale. As an example, an inversion may provide for estimation of a vector for each of a number of spatial locations. For example, consider a vector that is a triplet of porosity, water saturation, and volume of clay (e.g., a vector that includes three values for three different physical properties). As an example, a number of physical properties may include porosity and one or more of water saturation and volume of clay.

As an example, a method may include performing an inversion responsive to receiving of resistivity data. For example, consider a downhole tool that may transmit resistivity data (e.g., amplitude, phase, etc.) for one or more downhole locations (e.g., measured depths, etc.) where upon receipt of such data, a method may automatically perform an inversion. In such a manner, equipment may be automated responsive to data availability. As an example, a method may include transforming received resistivity data to resistivity values. For example, raw resistivity data may be in one or more forms whereby transformation of such data provides resistivity values, which may be spatially located (e.g., with respect to a measured depth, etc.). As explained, resistivity data may be received along with corresponding timestamps where such data may be transformed or otherwise assigned spatial information (e.g., measured depth, 2D coordinates, 3D coordinates, etc.). In various instances, a transformation of raw resistivity data to spatially located resistivity values may be referred to as a type of inversion.

As an example, a method may be automated with respect to one or more actions. For example, consider a method that may perform generating responsive to performing an inversion and/or may perform controlling responsive to performing generating. As an example, a method may provide for performing an automated control loop, with or without an HITL. As an example, controlling may occur in real-time responsive to receiving of resistivity data, for example, a method may provide for real-time control triggered responsive to receipt of resistivity data.

As an example, controlling can include controlling a drillstring to drill towards higher values of a reservoir quality metric where higher values indicate higher reservoir quality.

As an example, a method can include inverting that includes performing a joint inversion. For example, consider a joint inversion based on different types of data, such as, for example, seismic data and resistivity data. As mentioned, data may include actual field data and/or synthetic data. As an example, actual field data may be augmented, tailored, etc. For example, different types of data may be processed such that a desired resolution, etc., may be achieved for a reservoir quality metric, particularly in a region beyond an end of a borehole where drilling may be controlled to drill into the region.

As an example, a method can include generating uncertainties for reservoir quality metric values. For example, one or more derivatives may be utilized to generate uncertainty values. As explained, automation may depend on uncertainty where, for example, lesser uncertainty may provide for implementing a higher level of automation in drilling (e.g., less human involvement, decision-making, etc.).

As an example, a method can include comparing reservoir quality metric values to one or more pre-determined reservoir quality metric values to determine one or more deviations. In such an example, controlling may occur responsive to at least one of the one or more deviations exceeding a deviation threshold. As an example, controlling may occur automatically responsive to at least one of the one or more deviations exceeding a deviation threshold.

As an example, a method can include providing productivity values, assessing the productivity values with respect to reservoir quality metric values, and performing controlling based at least in part on the assessing. In such an example, performing the controlling can include directing a drillstring to maintain productivity of a borehole. For example, consider productivity as may be assessed by reservoir contact and/or reservoir quality. As an example, reservoir contact may be increased when a borehole is maintained within a pay zone and where the borehole is maintained within the pay zone and along a path of higher reservoir quality, productivity may be increased where the borehole is to be utilized for a production well to produce fluid from a reservoir that includes the pay zone.

As an example, a system can include a processor; memory accessible to the processor; and processor-executable instructions stored in the memory and executable by the processor to instruct the system to: receive resistivity data acquired by a downhole tool of a drillstring disposed at least in part in a borehole in a subsurface environment, where the borehole includes a downhole end, and where the borehole defines a borehole axis; receive seismic data for the subsurface environment, where the seismic data includes spatial locations; invert at least a portion of the resistivity data and at least a portion of the seismic data to estimate values for a number of physical properties of a portion of the subsurface environment; generate reservoir quality metric values using the values for the number of physical properties; and control the drillstring using the reservoir quality metric values.

As an example, one or more non-transitory computer-readable storage media can include processor-executable instructions executable to instruct a processor to: receive resistivity data acquired by a downhole tool of a drillstring disposed at least in part in a borehole in a subsurface environment, where the borehole includes a downhole end, and where the borehole defines a borehole axis; receive seismic data for the subsurface environment, where the seismic data include spatial locations; invert at least a portion of the resistivity data and at least a portion of the seismic data to estimate values for a number of physical properties of a portion of the subsurface environment; generate reservoir quality metric values using the values for the number of physical properties; and control the drillstring using the reservoir quality metric values.

As an example, one or more computer-readable storage media may include processor-executable instructions to instruct a computing system to perform one or more methods. In such an example, the one or more computer-readable storage media may be a program product (e.g., a computer program product, a computer system program product, etc.).

Figure 11:
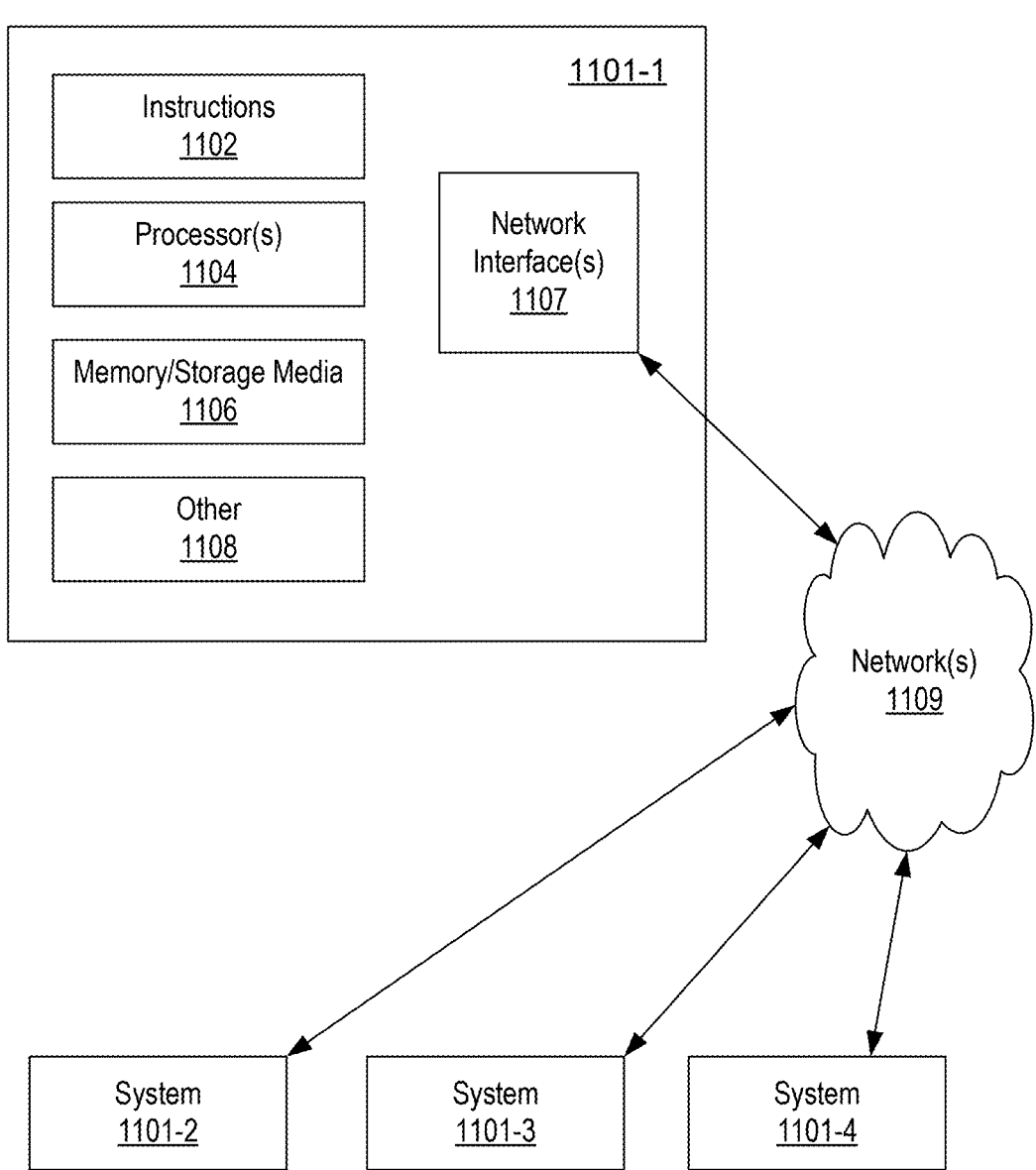
FIG. 11 illustrates examples of computing and networking equipment.

In some embodiments, a method or methods may be executed by a computing system. FIG. 11 shows an example of a system 1100 that may include one or more computing systems 1101-1, 1101-2, 1101-3 and 1101-4, which may be operatively coupled via one or more networks 1109, which may include wired and/or wireless networks.

As an example, a system may include an individual computer system or an arrangement of distributed computer systems. In the example of FIG. 11, the computer system 1101-1 may include one or more sets of instructions 1102, which may be or include processor-executable instructions, for example, executable to perform various tasks (e.g., receiving information, requesting information, processing information, simulation, outputting information, etc.).

As an example, a set of instructions may be executed independently, or in coordination with, one or more processors 1104, which is (or are) operatively coupled to one or more storage media 1106 (e.g., via wire, wirelessly, etc.). As an example, one or more of the one or more processors 1104 may be operatively coupled to at least one of one or more network interface 1107. In such an example, the computer system 1101-1 may transmit and/or receive information, for example, via the one or more networks 1109 (e.g., consider one or more of the Internet, a private network, a cellular network, a satellite network, etc.). As shown, one or more other components 1108 may be included.

As an example, the computer system 1101-1 may receive from and/or transmit information to one or more other devices, which may be or include, for example, one or more of the computer systems 1101-2, etc. A device may be located in a physical location that differs from that of the computer system 1101-1.

As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the storage media 1106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAS, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that may be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method, comprising:
receiving resistivity data acquired by a downhole tool of a drillstring disposed at least in part in a borehole in a subsurface environment, the borehole comprising a downhole end, the borehole defining a borehole axis;
receiving seismic data for the subsurface environment, the seismic data comprising a plurality of spatial locations;
performing, in a while-drilling, real-time process, a joint inversion of at least a portion of the resistivity data and at least a portion of the seismic data to estimate, for each of the plurality of spatial locations around and ahead of a drill bit, values for a plurality of physical properties of a portion of the subsurface environment, the plurality of physical properties comprising at least: porosity, water saturation, and volume of clay;
generating reservoir quality metric values for the portion of the subsurface environment, each reservoir quality metric value comprising a reservoir quality indicator (RQ) determined from the estimated porosity, water saturation, and volume of clay using a predefined analytic functional, the predefined analytic functional including RQ=Porosity/(Water Saturation*Volume of Clay); and
controlling the drillstring in real time using the reservoir quality metric values in an automated control loop, including instructing an autodriller to control one or more of a drawworks, a top drive, a hydraulics system, and a rotary steerable system such that drilling of the borehole is guided by the reservoir quality metric values where an actual direction of the drillstring is directed toward another portion of the subsurface environment having a constant reservoir quality metric value or a higher reservoir quality metric value than a particular reservoir quality metric value of the reservoir quality metric values of the portion of the subsurface environment.

2. The method of claim 1, wherein the seismic data comprises surface seismic data of the subsurface environment.

3. The method of claim 1, further comprising performing the joint inversion responsive to the receiving the resistivity data.

4. The method of claim 3, further comprising performing the generating responsive to the performing the joint inversion inverting.

5. The method of claim 4, further comprising performing the controlling responsive to the performing the generating.

6. The method of claim 1, wherein the controlling the drillstring in real time is responsive to the receiving the resistivity data.

7. The method of claim 1, wherein the controlling further comprises dynamically adjusting steering parameters based on spatial gradients of the reservoir quality metric values.

8. The method of claim 1, further comprising generating uncertainties for the reservoir quality metric values.

9. The method of claim 1, further comprising comparing the reservoir quality metric values to one or more predetermined reservoir quality metric values to determine one or more deviations.

10. The method of claim 9, wherein the controlling occurs responsive to at least one of the one or more deviations exceeding a deviation threshold.

11. The method of claim 1, wherein the seismic data comprises synthetic seismic data.

12. The method of claim 1, further comprising:
providing productivity index values for the portion of the subsurface environment, the productivity index values representing productivity of the portion of the subsurface environment;
assessing the productivity index values with respect to the reservoir quality metric values; and
performing the controlling based at least in part on the assessing.

13. The method of claim 12, wherein the performing the controlling comprises directing the drillstring to maintain productivity of the borehole.

14. The method of claim 1, wherein the joint inversion is performed using a machine learning model trained on a dataset of known reservoir properties and corresponding resistivity and seismic data.

15. The method of claim 1, wherein the reservoir quality metric values are used to control the drillstring in real-time to avoid drilling into a new portion of the subsurface environment having a lower reservoir quality metric value than the reservoir quality metric value of the portion of the subsurface environment.

16. The method of claim 1, wherein the joint inversion is performed using a combination of seismic data and resistivity data acquired by a plurality of downhole tools, including at least one tool located behind the drill bit and at least one tool located ahead of the drill bit.

17. A system, comprising:
one or more processors;
memory accessible to the one or more processors; and
processor-executable instructions stored in the memory and executable by the one or more processors to instruct the system to:
receive resistivity data acquired by a downhole tool of a drillstring disposed at least in part in a borehole in a subsurface environment, the borehole comprising a downhole end, the borehole defining a borehole axis;
receive seismic data for the subsurface environment, the seismic data comprising a plurality of spatial locations;
perform, in a while-drilling, real-time process, a joint inversion of at least a portion of the resistivity data and at least a portion of the seismic data to estimate, for each of the plurality of spatial locations around and ahead of a drill bit, values for a plurality of physical properties of a portion of the subsurface environment, the plurality of physical properties comprising at least: porosity, water saturation, and volume of clay;
generate reservoir quality metric values for the portion of the subsurface environment, each reservoir quality metric value comprising a reservoir quality indicator (RQ) determined from the estimated porosity, water saturation, and volume of clay using a predefined analytic functional, the predefined analytic functional including RQ=Porosity/(Water Saturation*Volume of Clay); and
control the drillstring in real time using the reservoir quality metric values in an automated control loop, including instructing an autodriller to control one or more of a drawworks, a top drive, a hydraulics system, and a rotary steerable system such that drilling of the borehole is guided by the reservoir quality metric values where an actual direction of the drillstring is directed toward another portion of the subsurface environment having a constant reservoir quality metric value or a higher reservoir quality metric value than a particular reservoir quality metric value of the reservoir quality metric values of the portion of the subsurface environment.

18. One or more non-transitory computer-readable storage media comprising processor-executable instructions executable to instruct one or more processors to:

receive resistivity data acquired by a downhole tool of a drillstring disposed at least in part in a borehole in a subsurface environment, the borehole comprising a downhole end, the borehole defining a borehole axis;

receive seismic data for the subsurface environment, the seismic data comprising a plurality of spatial locations;

perform, in a while-drilling, real-time process, a joint inversion of at least a portion of the resistivity data and at least a portion of the seismic data to estimate, for each of the plurality of spatial locations around and ahead of a drill bit, values for a plurality of physical properties of a portion of the subsurface environment, the plurality of physical properties comprising at least: porosity, water saturation, and volume of clay;

generate reservoir quality metric values for the portion of the subsurface environment, each reservoir quality metric value comprising a reservoir quality indicator (RQ) determined from the estimated porosity, water saturation, and volume of clay using a predefined analytic functional, the predefined analytic functional including RQ=Porosity/(Water Saturation*Volume of Clay); and control the drillstring in real time using the reservoir quality metric values in an automated control loop, including instructing an autodriller to control one or more of a drawworks, a top drive, a hydraulics system, and a rotary steerable system such that drilling of the borehole is guided by the reservoir quality metric values where an actual direction of the drillstring is directed toward another portion of the subsurface environment having a constant reservoir quality metric value or a higher reservoir quality metric value than a particular reservoir quality metric value of the reservoir quality metric values of the portion of the subsurface environment.

* * * * *